(12) United States Patent
Kawakubo et al.

(10) Patent No.: US 8,117,912 B2
(45) Date of Patent: Feb. 21, 2012

(54) MULTIAXIAL ACCELERATION SENSOR AND ANGULAR VELOCITY SENSOR

(75) Inventors: Takashi Kawakubo, Yokohama (JP); Toshihiko Nagano, Kawasaki (JP); Michihiko Nishigaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 511 days.

(21) Appl. No.: 12/411,861

(22) Filed: Mar. 26, 2009

(65) Prior Publication Data

US 2010/0064804 A1     Mar. 18, 2010

(30) Foreign Application Priority Data

Sep. 18, 2008   (JP) ................................. 2008-239448

(51) Int. Cl.
*G01P 15/09* (2006.01)
(52) U.S. Cl. .................................... 73/504.03
(58) Field of Classification Search ........................ None
See application file for complete search history.

(56) References Cited

U.S. PATENT DOCUMENTS

| | | | |
|---|---|---|---|
| 7,185,542 B2 * | 3/2007 | Bang et al. ................. | 73/514.29 |
| 7,332,849 B2 * | 2/2008 | Ling et al. ..................... | 310/331 |
| 7,434,482 B1 * | 10/2008 | Van Steenwyk et al. | 73/862.625 |
| 2010/0077858 A1 * | 4/2010 | Kawakubo et al. ........ | 73/504.12 |
| 2010/0242604 A1 * | 9/2010 | Sammoura et al. ........ | 73/514.34 |

FOREIGN PATENT DOCUMENTS

| JP | 3141954 | 12/2000 |
|---|---|---|
| JP | 3534251 | 3/2004 |

* cited by examiner

*Primary Examiner* — Hezron E Williams
*Assistant Examiner* — Mark A Shabman
(74) *Attorney, Agent, or Firm* — Finnegan, Henderson, Farabow, Garrett & Dunner, L.L.P.

(57) ABSTRACT

In a angular rate sensor, a weight and a base are connected directly through piezoelectric bimorph detectors and piezoelectric bimorph exciters each having a bent portion. When acceleration is applied to the weight, the weight is displaced so as to deform the piezoelectric bimorph detectors. Due to this deformation, charges generated in the piezoelectric bimorph detectors are detected so as to detect acceleration. If an angular rate is applied to the weight when the weight is vibrated by the piezoelectric bimorph exciters, Coriolis force is generated in the weight so as to deform the piezoelectric bimorph detectors. Due to this deformation, charges generated in the piezoelectric bimorph detectors are detected so as to detect the angular rate.

10 Claims, 18 Drawing Sheets

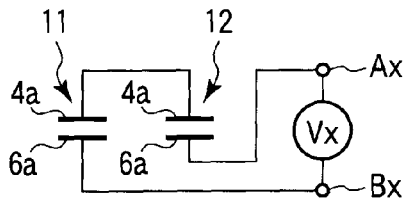
FIG. 11A
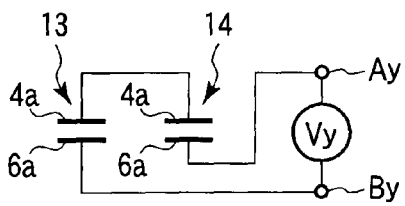
FIG. 11B
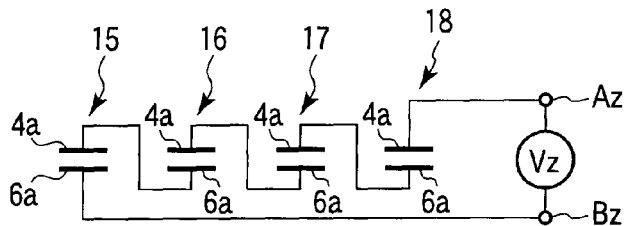
FIG. 11C
| Piezoelectric bimorph detector | Fx | Fy | Fz |
|---|---|---|---|
| 11 | ++ | 0 | ++ |
| 12 | -- | 0 | ++ |
| 13 | 0 | ++ | ++ |
| 14 | 0 | -- | ++ |
| 15 | + | + | ++ |
| 16 | - | + | ++ |
| 17 | - | - | ++ |
| 18 | + | - | ++ |
FIG. 12

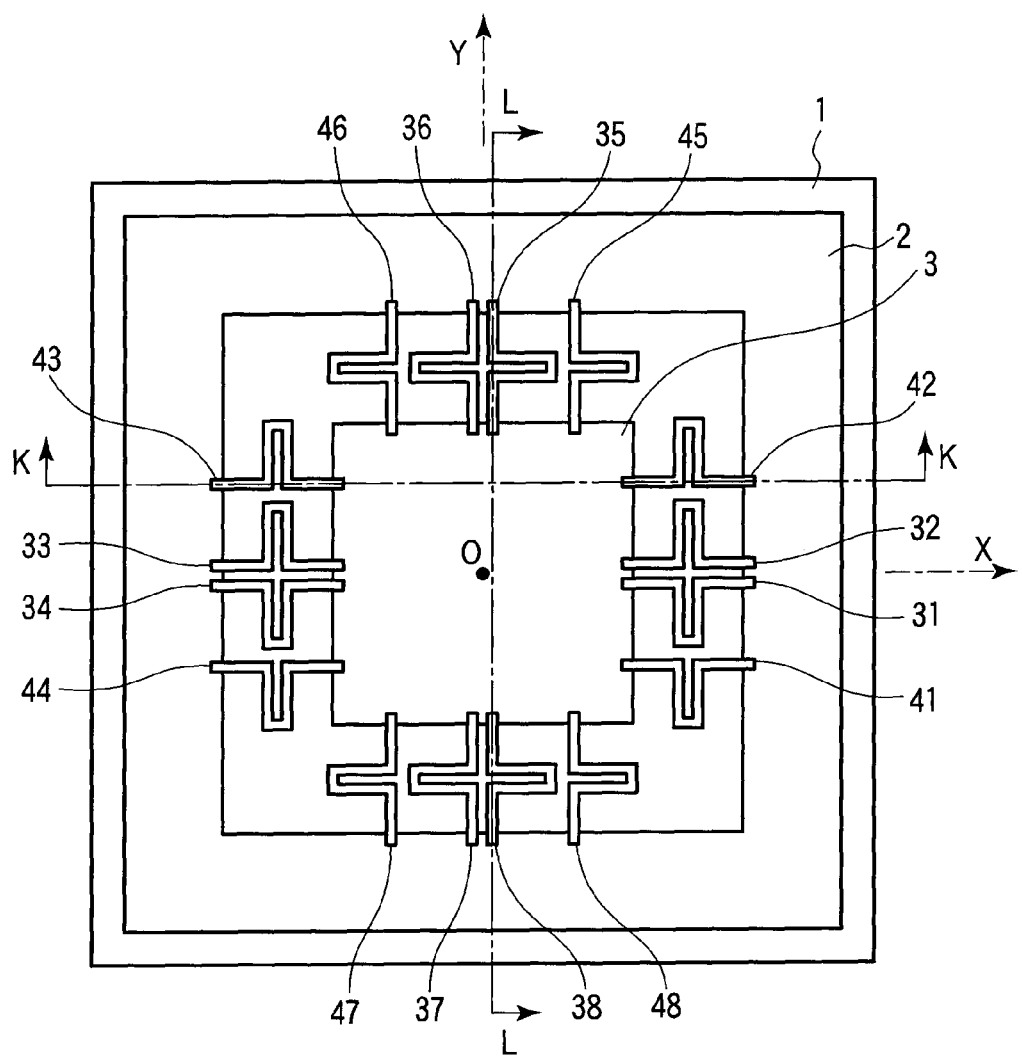
F I G. 22
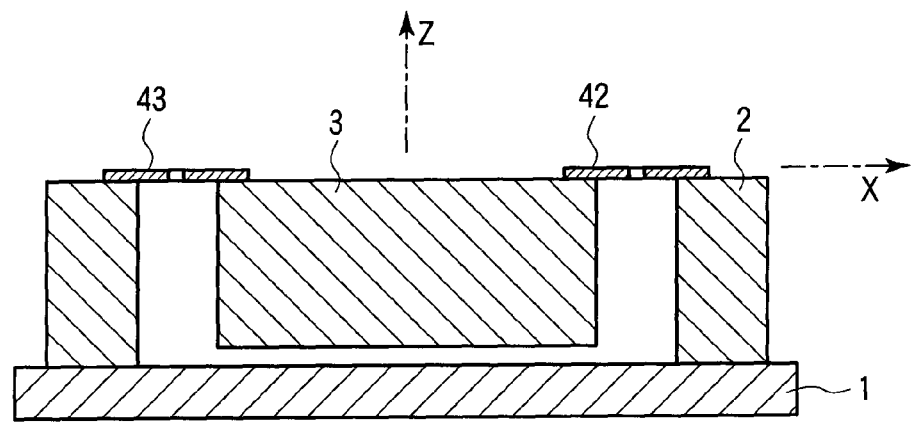
F I G. 23

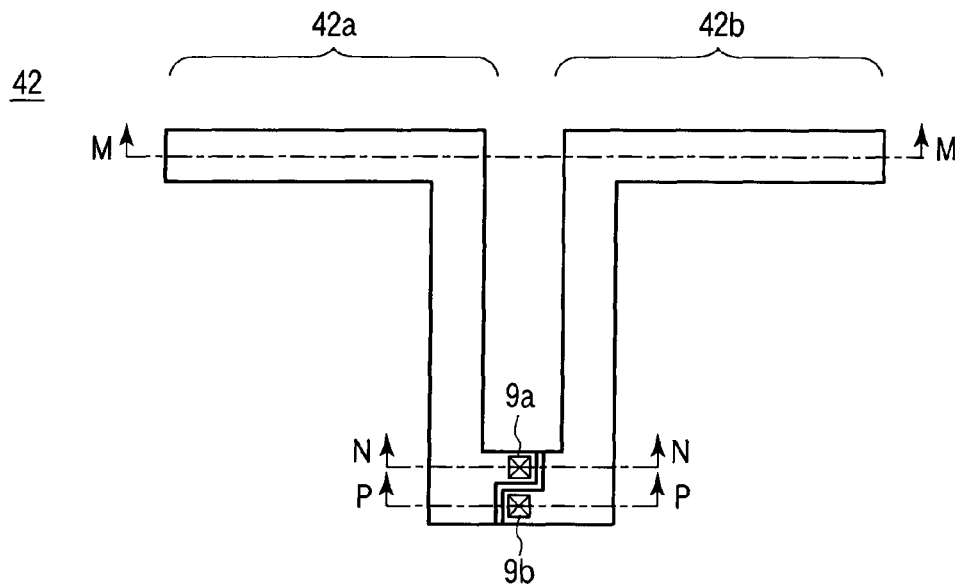
F I G. 24
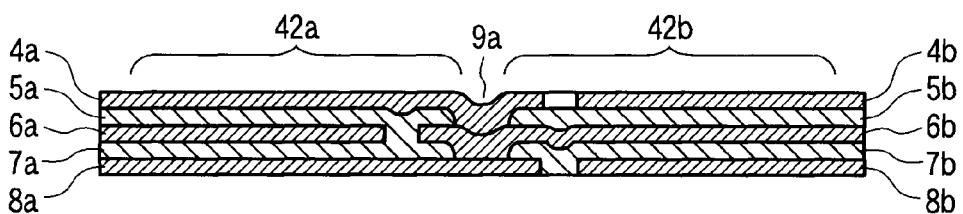
F I G. 25
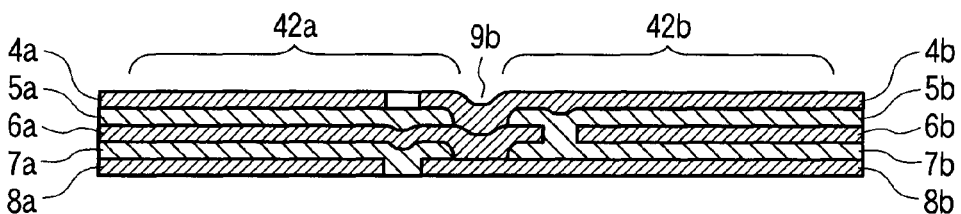
F I G. 26

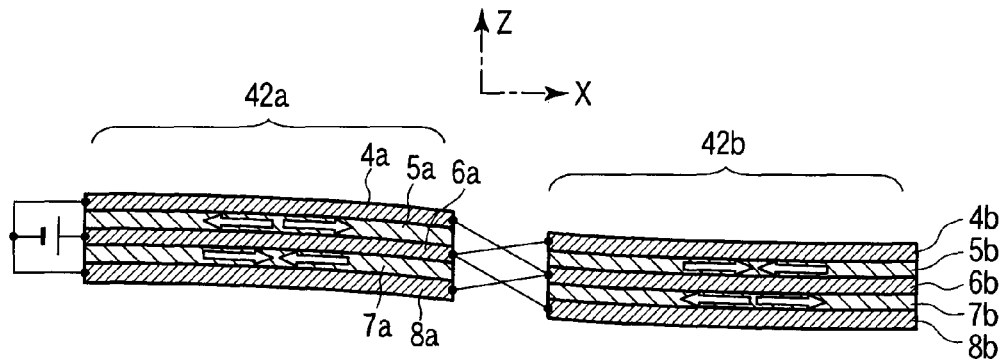
F I G. 27
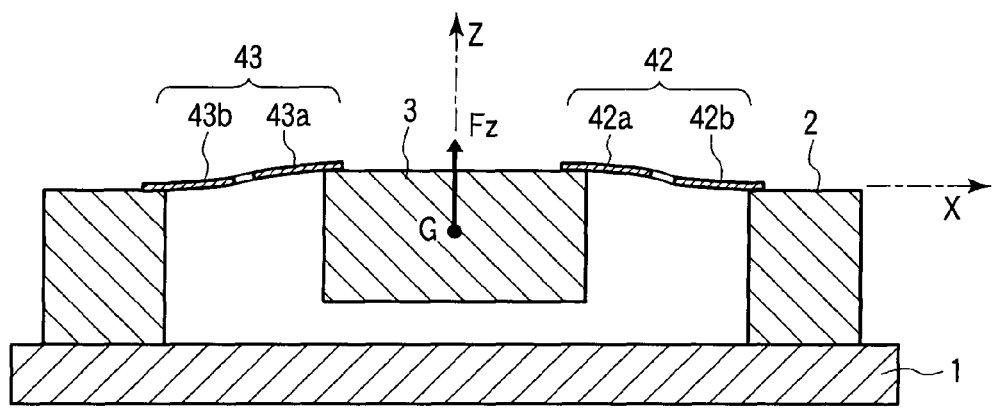
F I G. 28
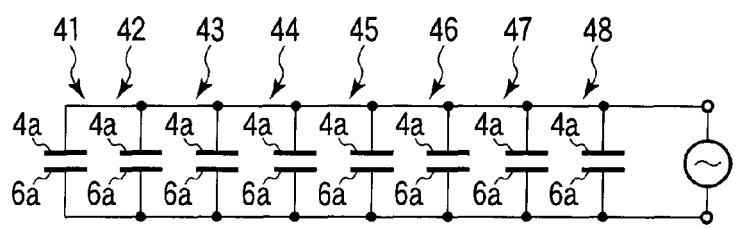
F I G. 29

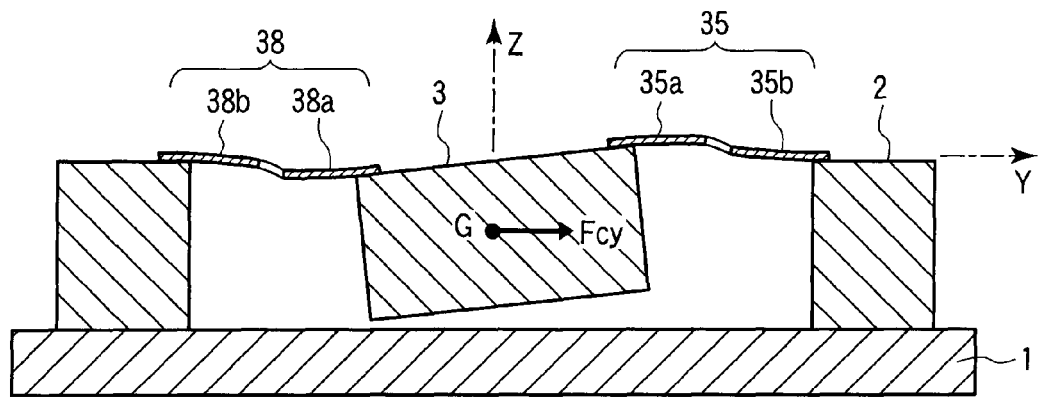
F I G. 30
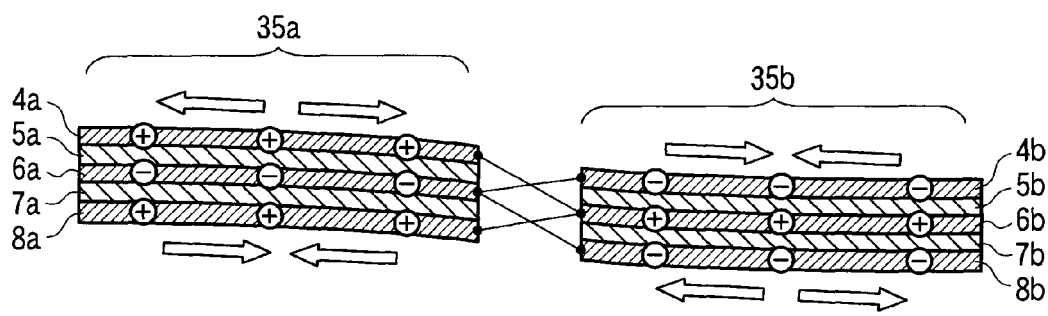
F I G. 31
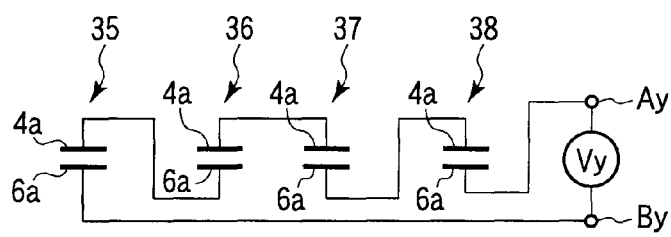
F I G. 32

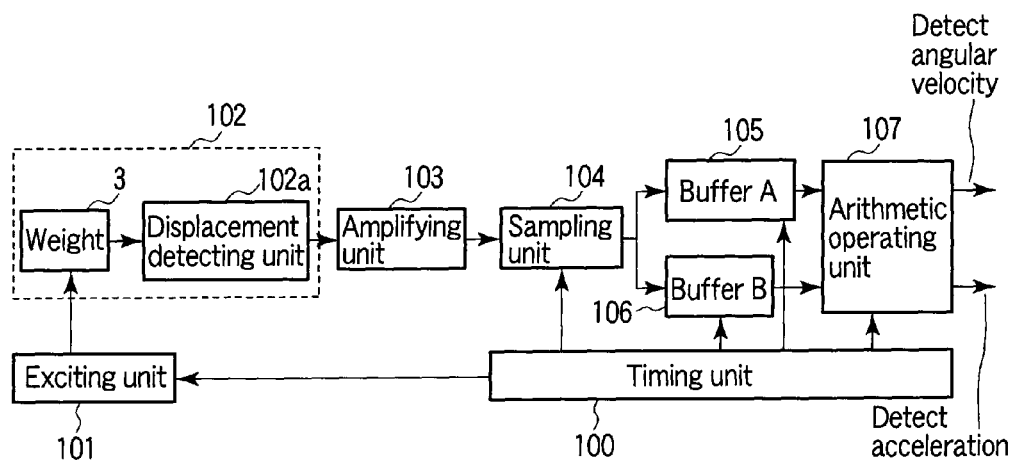
F I G. 33A
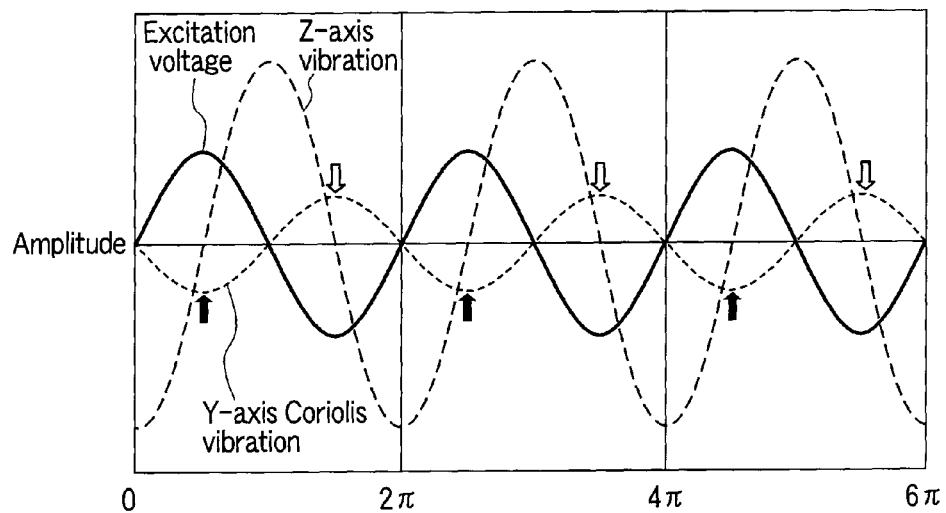
F I G. 33B

|  | Z-axis excitation device | X-axis detection device | Y-axis detection device |
|---|---|---|---|
| Second embodiment | 41,42,43,44,45,46,47,48 | 31,32,33,34 | 35,36,37,38 |
| First modification of second embodiment | 31,32,33,34,35,36,37,38 | 41,42,43,44 | 45,46,47,48 |
F I G. 34
|  | X-axis excitation device | Y-axis detection device | Z-axis detection device |
|---|---|---|---|
| Second modification of second embodiment | 31,32,33,34 | 35,36,37,38 | 41,42,43,44,45,46,47,48 |
| Third modification of second embodiment | 41,42,43,44 | 45,46,47,48 | 31,32,33,34,35,36,37,38 |
F I G. 35
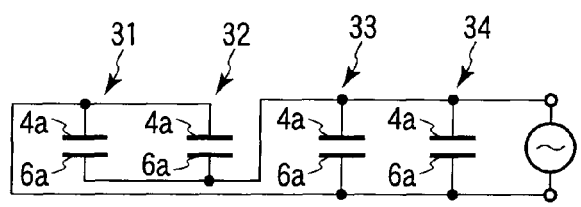
F I G. 36
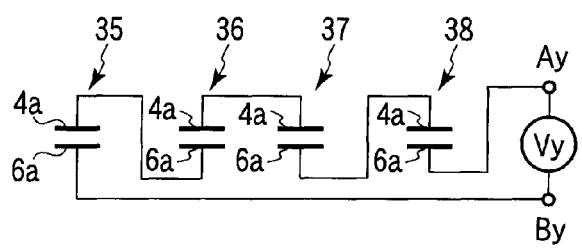
F I G. 37

| | Y-axis excitation device | X-axis detection device | Z-axis detection device |
|---|---|---|---|
| Fifth modification of second embodiment | 35,36,37,38 | 31,32,33,34 | 41,42,43,44,45,46,47,48 |
| Sixth modification of second embodiment | 45,46,47,48 | 41,42,43,44 | 31,32,33,34,35,36,37,38 |

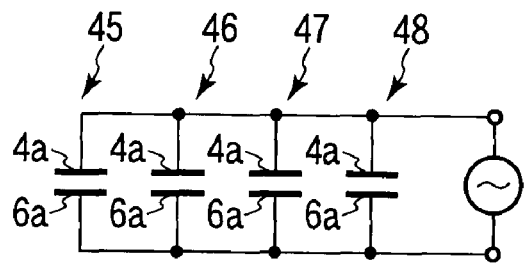
F I G. 40
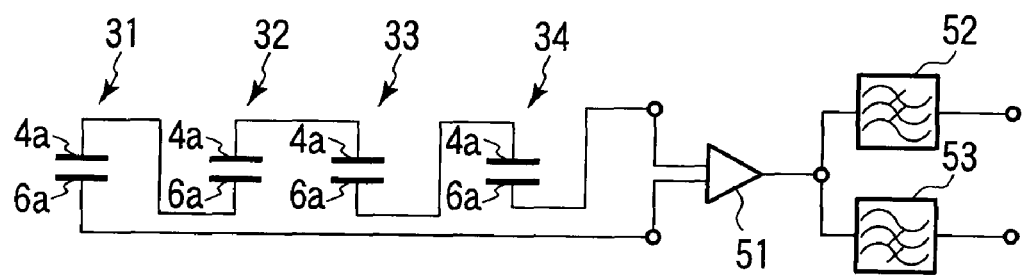
F I G. 41
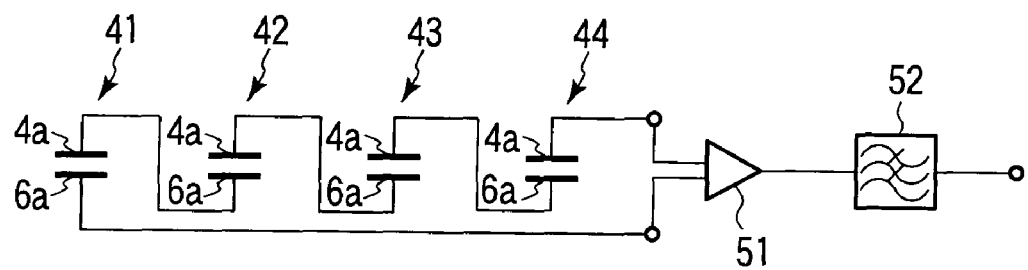
F I G. 42

MULTIAXIAL ACCELERATION SENSOR AND ANGULAR VELOCITY SENSOR

CROSS-REFERENCE TO RELATED APPLICATIONS

This application is based upon and claims the benefit of priority from prior Japanese Patent Application No. 2008-239448, filed Sep. 18, 2008, the entire contents of which are incorporated herein by reference.

BACKGROUND OF THE INVENTION

1. Field of the Invention

The present invention relates to a sensor capable of detecting three-axis accelerations and an angular rate around two axes using a piezoelectric device.

2. Description of the Related Art

In electronic industry, automobile industry and machine industry, demands for the multi-axial accelerometer and angular rate sensor having a small size and a high reliability have been increased. Such sensors are requested to be capable of detecting the acceleration and angular rate of each component of two dimensions or three dimensions.

The multi-axial accelerometer has a weight as disclosed in Japanese Patent 3141954 and this weight is held by a flexible base plate around the weight via the flexible base plates having flexibility and detecting devices are disposed on the base plate. In the accelerometer having such a structure, when acceleration is applied to the sensor, the weight is displaced receiving a force proportional to the acceleration so that a mechanical deformation is generated in the flexible base plate. In the sensor, the detecting devices provided on the flexible base plate detect a deformation of the flexible base plate generated accompanied by the acceleration so as to detect the acceleration. In the accelerometer having the piezoresistive device as its detecting device, this mechanical deformation of the flexible base plate is detected as a change in resistance in the piezoresistive device so as to detect the acceleration. Further, there has been known another accelerometer provided with a capacitance type device, having a structure in which electrode plates are disposed such that a electrode plate is opposed to another electrode plate provided on the flexible base plate as other detecting device than the piezoresistive device in order to detect the mechanical deformation of the flexible base plate as a change in capacitance between the electrode plates. According to Japanese Patent 3141954, a piezoelectric device in which piezoelectric membrane is sandwiched between two electrode plates is provided on the flexible base plate so as to detect the mechanical deformation of the flexible base plate as a change in charges generated in the piezoelectric device.

The multi-axial angular rate sensor has the same structure as the above-described multi-axial accelerometer and further an exciting device for applying vibration to the weight. In the angular rate sensor, the weight is vibrated cyclically in a specific axial direction by the exciting device. When an angular rate is generated around an axis perpendicular to the vibration axis of the weight during a vibration of the weight, a Coriolis force is applied in an axial direction perpendicular to these two axes. The weight is displaced by this Coriolis force, so that the flexible base plate connected to the weight is deformed. This mechanical deformation of the flexible base plate is detected by the detecting device so as to detect the angular rate. Japanese Patent 3534251 has disclosed an angular rate sensor for detecting the Coriolis force with a device for vibrating the flexible base plate with electrostatic force generated when a voltage is applied in between electrodes, a device for detecting changes in capacitance by vibrating the weight by means of a piezoelectric device for vibrating the base plate due to piezoelectric effect, a piezoresistive device, and the piezoelectric device.

However, in the sensor having the aforementioned piezoresistive device, its detection value contains an error if the temperature of ambient environment is changed, because the piezoresistive has temperature dependency. Thus, compensation of the temperature is necessary for an accurate measurement. Particularly in the case where the sensor is used in automobile industry, there occurs such a problem that the temperature compensation is required in a wide operating temperature range of −40° C. to 120° C.

Although the sensor for detecting the aforementioned changes in capacitance has an advantage that the manufacturing cost is low, it can hardly execute signal processing because a formed capacitance is small.

The aforementioned sensor having the piezoelectric device is advantageous in that its detection sensitivity is high because it generates an electromotive force directly. However, piezoelectric zirconate titanate (PZT) needs to be used as a piezoelectric device, thereby posing a problem that the piezoelectric constant of the PZT is highly dependent on the temperature.

The multi-axial accelerometer and angular rate sensor of prior art have problems that their temperature dependency is high or they are difficult to manufacture. Thus, the multi-axial accelerometer and angular rate sensor have been demanded to be of a smaller size and capable of executing high accuracy detection without any temperature compensation and be easy to manufacture.

BRIEF SUMMARY OF THE INVENTION

According to an aspect of the present invention, there is provided a triaxial accelerometer comprising:

a weight to which an acceleration is applied;

a base having a hollow space which allows the weight to move;

a plurality pairs of piezoelectric bimorph detectors having one ends connected to the base and other ends connected to the weight so as to support the weight movably with respect to the acceleration, which are arranged in a plane having first and second axes perpendicularly crossed on the weight, the plurality pairs of piezoelectric bimorph detectors including first pair of piezoelectric bimorph detectors arranged symmetrically with respect to the first axis, second pair of piezoelectric bimorph detectors arranged symmetrically with respect to the second axis, and third and fourth pairs of the piezoelectric bimorph detectors arranged symmetrically with respect to the first and second axes, wherein each of the piezoelectric bimorph detectors is so shaped as to have first and second straight portions linearly extended from the one end and the other end, respectively, and bent portions coupling the first and second straight portions and extended in a bent shape from the straight portions, and each of the piezoelectric bimorph detectors has a deformable laminated structure having first, second and third electrodes and first and second piezoelectric films which are disposed between the first and second electrodes, and the second and third electrodes, respectively, the first, second and third electrodes generating voltages depending on a deformation of the laminated structure which is produced due to the acceleration applied to the weight; and a detection circuit which detects each of three dimensional components of the acceleration from the voltages.

According to anther aspect of the present invention, there is provided a biaxial angular rate sensor comprising:

a weight to which one or both of an acceleration and a Coriolis force are applied;

a base having a hollow space which allows the weight to move;

first and second pairs of piezoelectric bimorph detectors having one ends connected to the base and other ends connected to the weight so as to support the weight movably with respect to the acceleration and/or the Coriolis force, which are arranged in a plane having first and second axes perpendicularly crossed on the weight, wherein the first pair of piezoelectric bimorph detectors are arranged symmetrically with respect to the first axis, the second pair of piezoelectric bimorph detectors are arranged symmetrically with respect to the second axis, and each of the piezoelectric bimorph detectors is so shaped as to have first and second straight portions linearly extended from the one end and the other end, respectively, and first bent portions coupling the first and second straight portions and extended in a bent shape from the first and second straight portions;

third and fourth pairs of piezoelectric bimorph exciters having one ends connected to the base and other ends connected to the weight so as to support the weight, wherein the piezoelectric bimorph exciters are arranged in the plane having the first and second axes, the third pair of piezoelectric bimorph exciters are arranged symmetrically with respect to the first axis, the fourth pair of piezoelectric bimorph exciters are arranged symmetrically with respect to the second axis, and each of the piezoelectric bimorph exciters is so shaped as to have third and fourth straight portions linearly extended from the one end and the other end, respectively, and second bent portions coupling the third and fourth straight portions and extended in a bent shape from the third and fourth straight portions;

wherein each of the piezoelectric bimorph detectors and the piezoelectric bimorph exciters has a deformable laminated structure having first, second and third electrodes and first and second piezoelectric films which are disposed between the first and second electrodes, and the second and third electrodes, respectively, the first, second and third electrodes of the piezoelectric bimorph detectors generating voltages depending on a deformation of the laminated structure which is produced due to the acceleration applied to the weight, and each of the piezoelectric bimorph exciters is deformed due to an application of AC voltage so that each of the piezoelectric bimorph exciter vibrates the weight so as to generates the Coriolis force with the angular rate around the first and second axes of the weight; and a detection circuit which detects the acceleration and/or the angular rate acting around the first and second axes from the voltage.

BRIEF DESCRIPTION OF THE SEVERAL VIEWS OF THE DRAWING

FIG. 11A is a circuit diagram showing wiring of the piezoelectric bimorph detector shown in FIG. 1;

FIG. 11B is a circuit diagram showing wiring of the piezoelectric bimorph detector shown in FIG. 1;

FIG. 11C is a circuit diagram showing wiring of the piezoelectric bimorph detector shown in FIG. 1;

FIG. 12 is a table showing schematically the polarity and charge amount of charges generated on the upper electrode of each piezoelectric bimorph detector when a force is applied to the accelerometer shown in FIG. 1;

FIG. 22 is a top view showing schematically an angular rate sensor according to a second embodiment of the present invention;

FIG. 23 is a sectional view taken along the line K-K of the angular rate sensor shown in FIG. 22;

FIG. 24 is a top view showing schematically the piezoelectric bimorph detector shown in FIG. 22;

FIG. 25 is a sectional view taken along the line N-N of the piezoelectric bimorph detector shown in FIG. 22;

FIG. 26 is a sectional view taken along the line P-P of the piezoelectric bimorph detector shown in FIG. 22;

FIG. 27 is a schematic view showing the operation of a piezoelectric bimorph exciter when a voltage is applied to the piezoelectric bimorph exciter shown in FIG. 24;

FIG. 28 is a sectional view taken along the line X-X in FIG. 22 of the angular rate sensor or a schematic sectional view showing a state in which the force Fx in the X-axis direction is applied;

FIG. 29 is a circuit diagram showing wiring of the piezoelectric bimorph exciter shown in FIG. 22;

FIG. 30 is a sectional view taken along the line L-L in FIG. 22 of the angular rate sensor or a schematic sectional view showing a state in which the force Fcy in the Y-axis direction is applied;

FIG. 31 is a schematic view showing a state in which charges are generated in the electrodes due to the piezoelectric effect of the piezoelectric bimorph detector shown in FIG. 31;

FIG. 32 is a circuit diagram showing wiring of the piezoelectric bimorph detector shown in FIG. 22;

FIG. 33A is a block diagram showing signal processing on a signal detected by the circuit diagram shown in FIG. 32;

FIG. 33B is a graph showing the phase relation among the excitation voltage in the angular rate sensor shown in FIG. 22, the vibration in the Z-axis direction and the Coriolis force acting in the Y-axis direction;

FIG. 34 is a table showing a correspondence relation between the piezoelectric bimorph devices according to the second embodiment and a second modification;

FIG. 35 is a table showing a correspondence relation between the piezoelectric bimorph devices according to the second modification and a third modification;

FIG. 36 is a circuit diagram showing wiring of an excitation piezoelectric bimorph device according to the second modification;

FIG. 37 is a circuit diagram showing wiring of the piezoelectric bimorph device for detecting a force applied in the Y-axis direction according to the second modification;

FIG. 40 is a circuit diagram showing wiring of the excitation piezoelectric bimorph device in the angular rate sensor according to a third embodiment;

FIG. 41 is a circuit diagram showing wiring of the piezoelectric bimorph device for detecting a force applied in the X-axis direction in the angular rate sensor of the third embodiment; and FIG. 42 is a circuit diagram showing wiring of the piezoelectric bimorph device for detecting a force applied in the Z-axis direction in the angular rate sensor according to the third embodiment.

DETAILED DESCRIPTION OF THE INVENTION

Hereinafter, the multi-axial accelerometer and angular rate sensor according to embodiments of the present invention will be described with reference to the drawings as required.

First Embodiment

Figure 1:
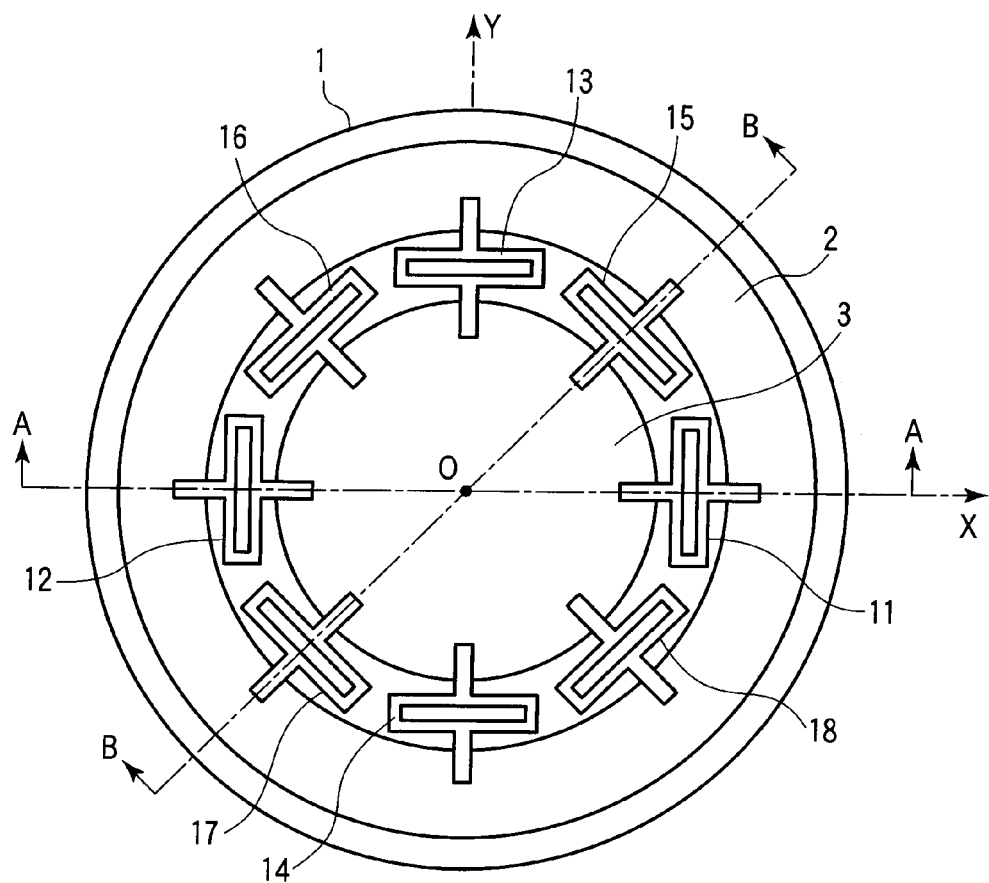
FIG. 1 is a top view showing schematically an accelerometer according to a first embodiment of the present invention.
Figure 2:
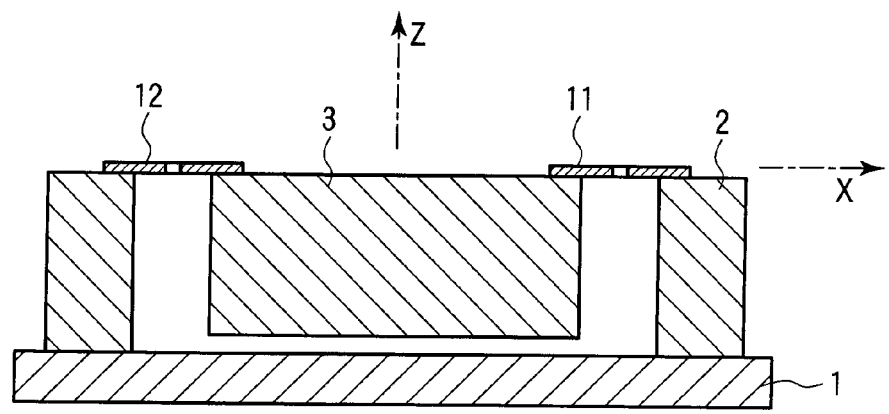
FIG. 2 is a sectional view taken along the line A-A of the accelerometer shown in FIG. 1.

FIG. 1 is a top view showing schematically the accelerometer of this embodiment and FIG. 2 is a sectional view taken along the line A-A of FIG. 1.

The accelerometer includes a disc-like base plate 1, a supporting ring-like or frame-like base 2 which is provided and fixed to the top face of the base plate 1, having a supporting surface and in which a hollow portion is formed internally, a disc-like weight 3 disposed in the central area of the base plate 1 within the ring-like base 2, and eight (first to fourth pairs of) piezoelectric bimorph detectors 11 to 18, each end of which is connected to the supporting surface of the base 2 while the other end is connected to the weight 3 so that each thereof is flexed. The piezoelectric bimorph detectors 11 to 18 of the first to fourth pairs have an identical size and shape as shown in FIG. 1.

In this specification, considering convenience for description, a home position O is set in the center of the top surface of the weight 3 and X-axis, Y-axis and Z-axis are set in arrow directions in FIGS. 1 and 2 so as to define a XYZ three-dimensional coordinate system. The XY plane is a plane (virtual plane) parallel to the supporting surface of the base 2 and the Z-axis is extended from an intersection (corresponding to the home position O) of the X-axis and the Y-axis and is perpendicular to the supporting surface.

FIG. 2 shows a section of a sensor taken along the line A-A or the X-axis in FIG. 1. As described later, when acceleration acts on the weight 3, the weight 3 is displaced, so that mechanical deformation is generated in the piezoelectric bimorph detectors 11 to 18. Then, the piezoelectric bimorph detectors 11 to 18 generate a voltage corresponding to this mechanical deformation. Because this voltage has a value relating to the applied acceleration, an acceleration applied to the accelerometer is detected based on a detection signal output from the piezoelectric bimorph detectors 11 to 18. The piezoelectric bimorph detectors 11, 12 of the first pair are disposed symmetrically with respect to the Y-axis, the piezoelectric bimorph detectors 13, 14 of the second pair are disposed symmetrically with respect to the X-axis and the piezoelectric bimorph detectors 15, 16, 17, 18 of the third and fourth pairs are disposed symmetrically with respect to the X-axis and the Y-axis.

Figure 3:
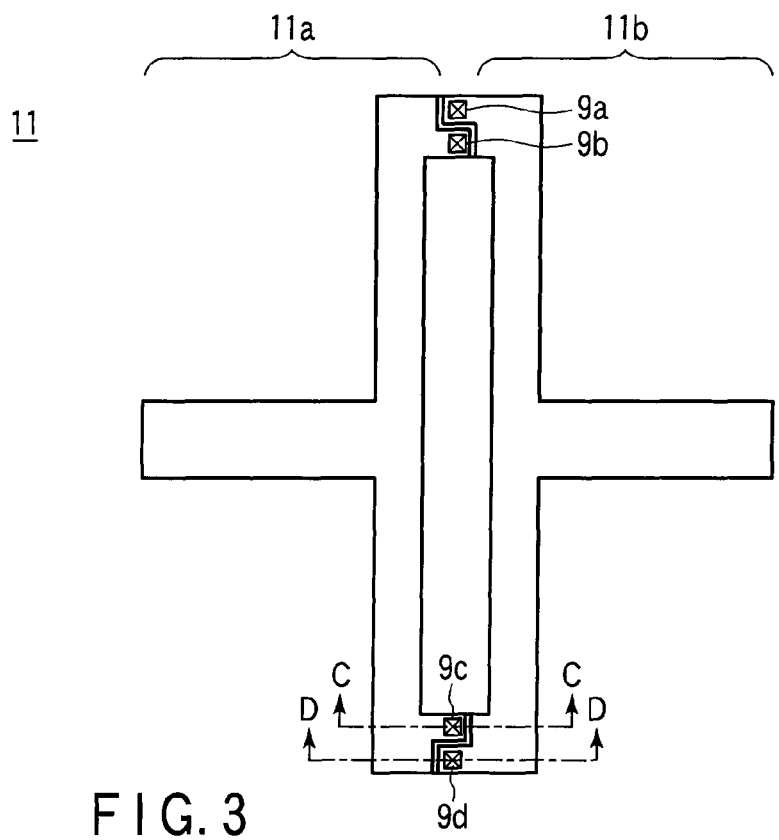
FIG. 3 is a plan view showing schematically a piezoelectric bimorph detector shown in FIG. 1.
Figure 4:
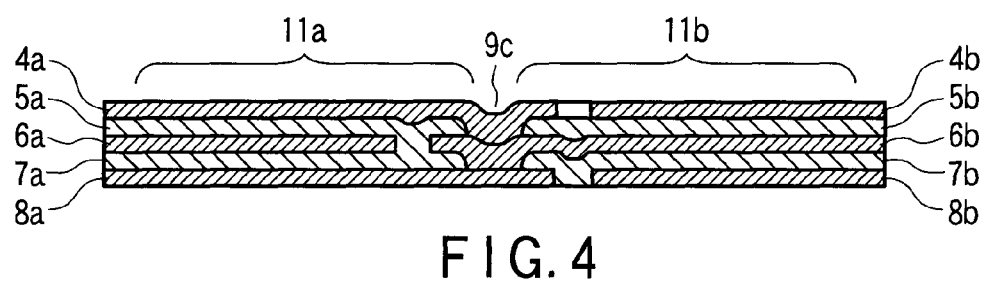
FIG. 4 is a sectional view taken along the line C-C of the piezoelectric bimorph detector shown in FIG. 3.
Figure 5:
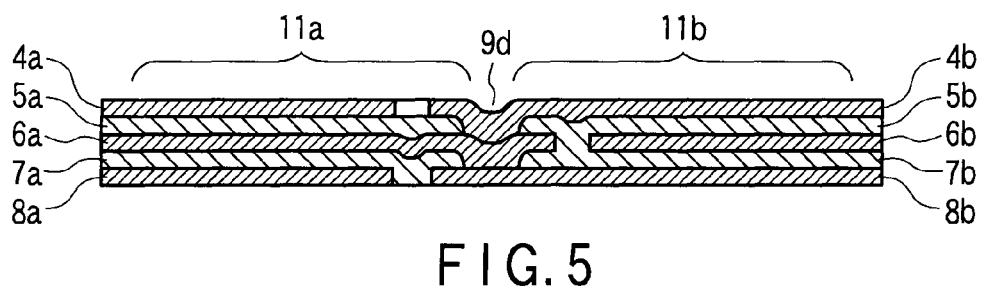
FIG. 5 is a sectional view taken along the line D-D of the piezoelectric bimorph detector shown in FIG. 3.
Figure 6A:
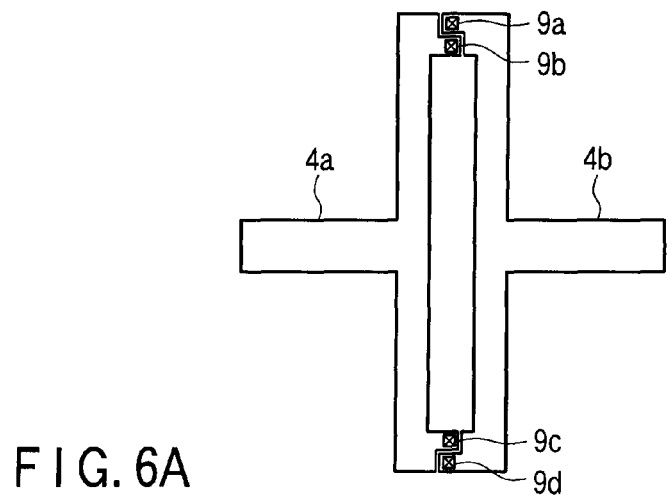
FIG. 6A is a plan view showing an upper electrode of the piezoelectric bimorph detector shown in FIG. 3.
Figure 6B:
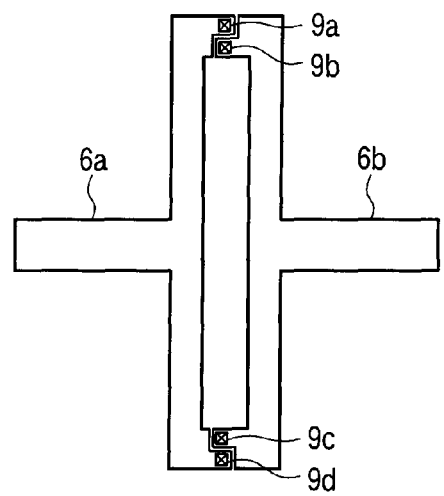
FIG. 6B is a plan view showing an intermediate electrode of the piezoelectric bimorph detector shown in FIG. 3.
Figure 6C:
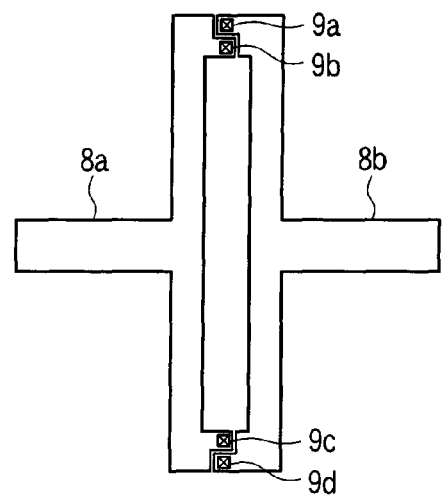
FIG. 6C is a plan view showing a lower electrode of the piezoelectric bimorph detector shown in FIG. 3.

The structure of the piezoelectric bimorph detectors 11 to 18 will be described in detail. As shown in FIG. 1, the piezoelectric bimorph detectors 11 to 18 for connecting the base 2 with the weight 3 are disposed on the top surface of the base 2 symmetrically with respect to the X-axis and the Y-axis. Here, the piezoelectric bimorph detectors 11, 12 are provided in order to detect acceleration in the X-axis direction, the piezoelectric bimorph detectors 13, 14 are provided in order to detect acceleration in the Y-axis direction and the piezoelectric bimorph detectors 15 to 18 are provided in order to detect acceleration in the Z-axis direction. These piezoelectric bimorph detectors 11 to 18 all have an identical structure. The structure of a piezoelectric bimorph detector, for example, the piezoelectric bimorph detector 11 is shown in FIGS. 3 to 6C. The structure of this piezoelectric bimorph detector 11 will be described with reference to FIGS. 3 to 6C. FIG. 3 is a top view showing schematically the piezoelectric bimorph detector 11. FIG. 4 is a sectional view taken along the line C-C in FIG. 3 and FIG. 5 is a sectional view taken along the line D-D in FIG. 3. FIGS. 6A, 6B and 6C are plan views showing schematically the planar shapes of an upper electrode 4, an intermediate electrode 6 and a lower electrode 8.

As shown in FIGS. 3 to 5, the piezoelectric bimorph detector 11 is constituted of a substantially T-shaped first portion 11a and a substantially T-shaped second portion 11b and, when the substantially T-shaped first portion 11a and the substantially T-shaped second portion 11b are combined, a rectangular frame or ring-like portion is formed, while respective linear portions are extended to the supporting base 2 and the weight 3 from this frame portion or the ring-like portion. The first portion 11a and the second portion 11b of the piezoelectric bimorph detector 11 have a lamination structure in which a pair of upper electrodes 4a, 4b and a pair of upper piezoelectric films 5a, 5b as shown in FIG. 6A, a pair of intermediate electrodes 6a, 6b and a pair of lower piezoelectric films 7a, 7b as shown in FIG. 6B and a pair of lower electrodes 8a, 8b as shown in FIG. 6C are stacked. The first portion 11a of the piezoelectric bimorph detector 11 corresponds to a portion on the side connected to the weight 3 and the second portion 11b corresponds to a portion on the side connected to the base 2. In the first portion 11a and the second portion 11b, their respective electrodes are not formed to be extended continuously but formed not to be in physical contact with each other, as shown in FIGS. 4 and 5. That is, the upper electrode 4a and the upper electrode 4b, the intermediate electrode 6a and the intermediate electrode 6b and the lower electrode 8a and the lower electrode 8b are not connected with each other respectively electrically but separated electrically. As shown in FIG. 4, the upper electrode 4a and the lower electrode 8a of the first portion 11a are connected electrically to the intermediate electrode 6b of the second portion 11b through via holes 9b and 9c. As shown in FIG. 5, the intermediate electrode 6a of the first portion 11a is connected electrically to the upper electrode 4b and the lower electrode 8b of the second portion 11b through via holes 9a and 9d. Thus, in the first portion 11a, the upper electrode 4a and the lower electrode 8a are maintained at a first potential and the intermediate electrode 6a is supplied with a different second potential. In the second portion 11b, the intermediate electrode 6b is maintained at the same first potential as the upper electrode 4a and the lower electrode 8a. In the second portion 11b, the upper electrode 4b and the lower electrode 8b are maintained at the second potential and the intermediate electrode 6b is supplied with the different first potential. In the second portion 11b, the intermediate electrode 6b is maintained at the same first potential as the upper electrode 4a and the lower electrode 8a. The upper piezoelectric films 5a, 5b and the lower piezoelectric films 7a, 7b sandwiched between the electrodes are formed to have a polarization in the Z-axis direction.

Because according to the present invention, the weight 3 and the base 2 are connected directly to each other through the piezoelectric bimorph detectors 11 to 18, the piezoelectric bimorph detectors 11 to 18 have a low flexural stiffness. Thus, the detection sensitivity of the piezoelectric bimorph detectors 11 to 18 is improved. Although generally, a member whose piezoelectric constant has a small temperature dependency, for example, aluminum nitride (AlN) or zinc oxide (ZnO) is inferior to lead zirconate titanate (PZT) in detection sensitivity, the piezoelectric film hardly affected by the temperature can be used as the piezoelectric bimorph detectors 11 to 18, because their temperature dependency is small. Further, because the low flexural stiffness can be provided to the piezoelectric bimorph detectors 11 to 18, even the weight 3 whose mass and dimension are small enables the acceleration to be detected at a sufficient accuracy.

Although the piezoelectric bimorph detectors 11 to 18 only need to be disposed symmetrically with respect to the X-axis and Y-axis, the quantity and arrangement positions of the piezoelectric bimorph detectors 11 to 18 are not restricted to the above-described structure.

Next, the shape of the piezoelectric bimorph detectors 11 to 18 will be described more in detail. The piezoelectric bimorph detectors 11 to 18 have a structure in which the ring-like or rectangular frame portion is combined with the linear portions as shown in FIG. 3. According to the present invention, the piezoelectric bimorph detectors 11 to 18 are connected directly to the weight 3 and the base 2 without being placed on any other member. In this accelerometer, the piezoelectric bimorph detectors 11 to 18 need to be formed directly on the supporting surfaces of the weight 3 and the base 2 according to film formation method. Usually, when the piezoelectric bimorph detectors 11 to 18 are formed directly according to the film formation method, residual stress is generated within the piezoelectric film. This residual stress affects the detection sensitivity of the piezoelectric bimorph detectors 11 to 18 seriously.

In the conventional accelerometer in which the weight 3 and the base 2 are connected through the flexible base plate, residual stress is generated in the flexible base plate in a process of forming the flexible base plate. However, by forming the flexible base plate with a thin film single-crystal silicon layer of an SOI wafer, the problem about the residual stress in the flexible base plate can be avoided.

However, it is generally thought that generation of the residual stress of a certain extent is unavoidable in case of connecting the weight 3 and the base 2 directly using the piezoelectric bimorph detectors 11 to 18. Generally, when linear piezoelectric bimorph detectors are incorporated in a sensor, a fact that the sensitivity of the detectors is affected largely by the residual stress has been found by the inventor of the present invention. This will be described later as a comparative example. To avoid the problem of the residual stress, the piezoelectric bimorph detectors 11 to 18 for use in the present invention are formed into a shape in which the closed rectangle or the ring-like portion is combined with any linear portion.

Figure 10:
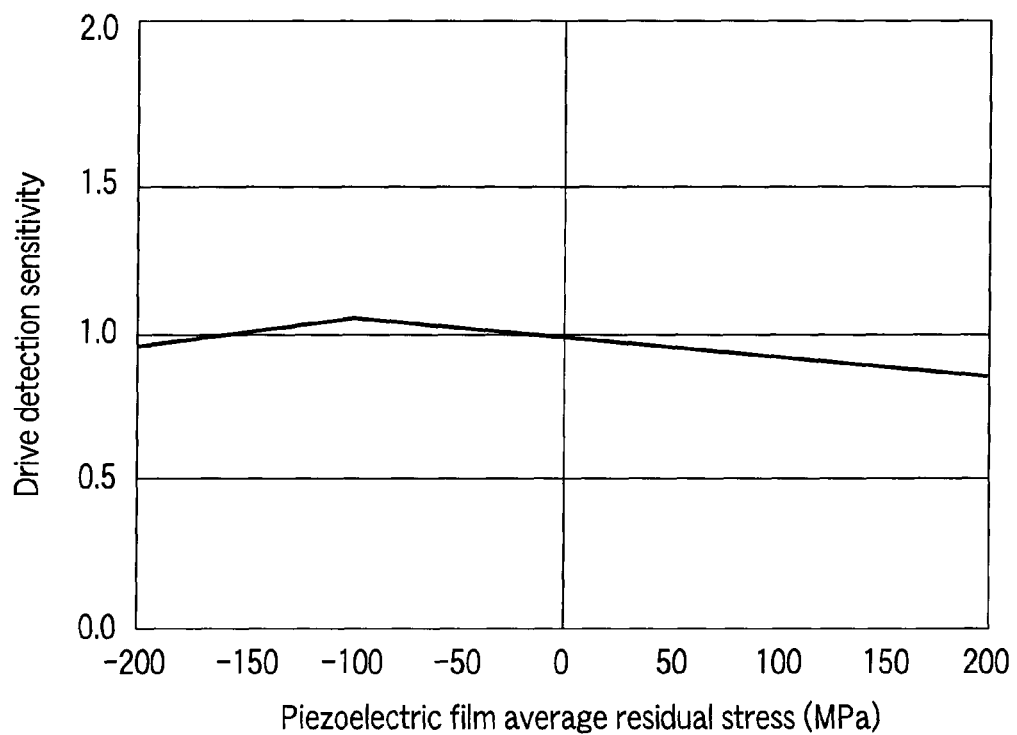
FIG. 10 is a graph showing a result of simulation about the drive detection sensitivity of the piezoelectric bimorph detector when residual stress exists on the piezoelectric film of the piezoelectric bimorph detector shown in FIG. 1.

The accelerometer of the first embodiment has the piezoelectric bimorph detectors 11 to 18 each having the shape in which the frame or the ring-like portion is combined with the linear portion as described above. FIG. 10 shows a result of simulation according to the finite element method based on specific response in case where residual stress exists in the piezoelectric film. In the piezoelectric bimorph detectors 11 to 18 for use in the simulation, the upper electrodes 4a, 4b, the intermediate electrodes 6a, 6b and the lower electrodes 8a, 8b are formed of aluminum (Al) having a thickness of 0.2 μm and the upper piezoelectric films 5a, 5b and the lower piezoelectric films 7a, 7b are formed of aluminum nitride (AlN) having a thickness of 1 μm. FIG. 10 indicates the detection sensitivity of the detector with respect to an average residual stress of the upper piezoelectric films 5a, 5b and the lower piezoelectric films 7a, 7b as a ratio of the detection sensitivity in the case where no residual stress exists. When the average residual stress is a negative value, it means that compressed residual stress exists within the piezoelectric film and when it is a positive value, it means that tensile residual stress exists. A residual stress of about 200 MPa cannot be avoided even in a currently best film formation apparatus for mass production if considering in-plane uniformity of a wafer. Thus, the result of the simulation indicates that the average residual stress of the upper piezoelectric film 5 and the lower piezoelectric film 7 is in the range of −200 MPa to 200 MPa. As evident from FIG. 10, drop of the sensitivity is held within 15% by the tensile residual stress of 200 MPa. The change of the sensitivity by the compressed residual stress is within 10%. This sensitivity change is very small as compared with a comparative example described later and can be corrected easily by calibration of a detection circuit.

The shape of the piezoelectric bimorph detectors 11 to 18 only needs to have at least a planar flexural portion in the X-Y plane and is not restricted to the shape in which the ring-like portion and the linear portion are combined.

Figure 7:
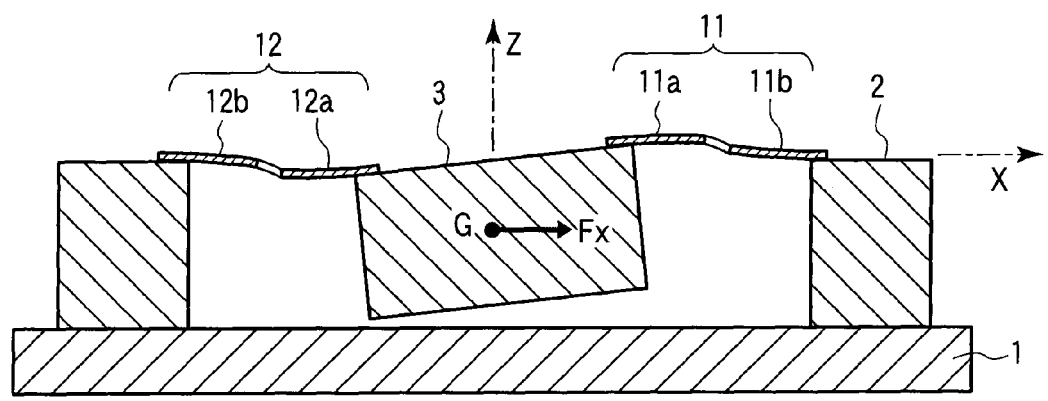
FIG. 7 is a schematic view showing a state in which a force Fx in the X-axis direction is applied to the accelerometer shown in FIG. 1.
Figure 8:
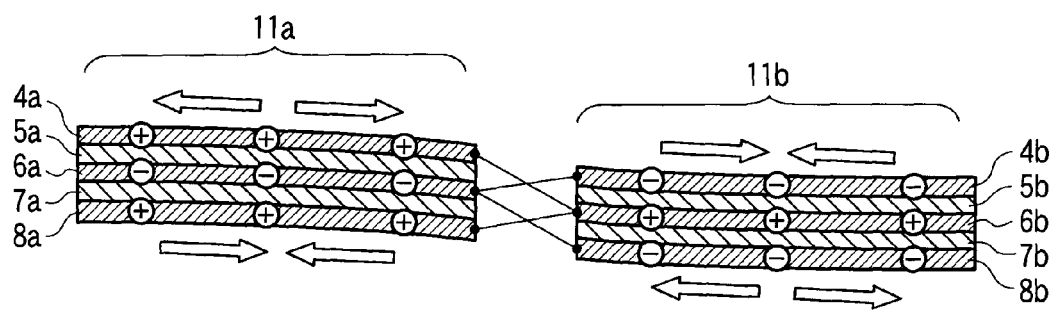
FIG. 8 is a schematic view showing a state in which the piezoelectric bimorph detector shown in FIG. 7 is deflected by the force Fx in the X-axis direction so as to generate charges in this piezoelectric bimorph detector.
Figure 9:
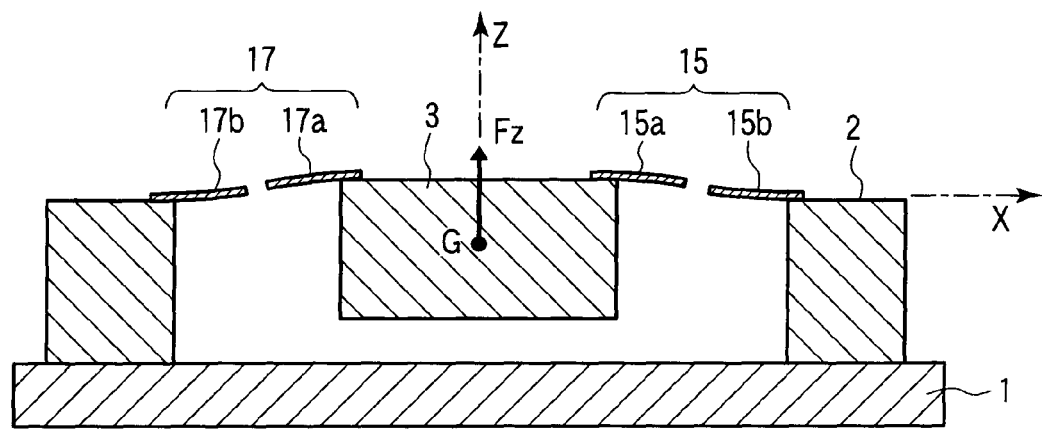
FIG. 9 is a sectional view taken along the line B-B shown in FIG. 1 of the accelerometer or a schematic view showing a condition in which the force Fz in the Z-axis direction is applied.

Next, an operation of the aforementioned accelerometer in the case where an acceleration is applied to the sensor will be described with reference to FIGS. 7 to 9. FIGS. 7 and 9 show a sectional view of the sensor taken along the line A-A and the line B-B in FIG. 1. When the acceleration in the X-axis direction is applied to the weight 3, a force Fx (having a magnitude proportional to the mass of the weight 3) in the X-axis direction is generated in the gravity center G of the weight 3. Because the top portion of the weight 3 is fixed to the base with the piezoelectric bimorph detectors 11, 12, a counterclockwise moment is generated in the weight 3 by this force Fx. Then, the piezoelectric bimorph detectors 11, 12 are deformed as shown in FIG. 7. The first portion 11a of the piezoelectric bimorph detector 11 is flexed upward projectingly while the second portion 11b is flexed downward projectingly. The first portion 12a of the piezoelectric bimorph detector 12 is flexed downward projectingly while the second portion 12b is flexed upward projectingly.

The stress and piezoelectric effect generated in the piezoelectric bimorph detector 11 will be described with reference to FIG. 8. FIG. 8 shows schematically the modified piezoelectric bimorph detector 11 shown in FIG. 7. When the first portion 11a is flexed upward projectingly, a tensile force is applied to the upper piezoelectric film 5a so that positive charge is generated in the upper electrode 4a while negative charge is generated in the intermediate electrode 6a. Compression force is applied to the lower piezoelectric film 7a, negative charge is generated in the intermediate electrode 6a and positive charge is generated in the lower electrode 8a. When the second portion 11b is flexed downward projectingly, compression force is applied to the upper piezoelectric film 5b, so that negative charge is generated in the upper electrode 4b while positive charge is generated in the intermediate electrode 6b. Tensile force is applied to the lower piezoelectric film 7b, positive charge is generated in the intermediate electrode 6b and negative charge is generated in the lower electrode 8b. On the other hand, the upper electrode 4a and the lower electrode 8a are connected to the intermediate electrode 6b through the via hole 9c. The intermediate electrode 6a is connected to the upper electrode 4b and the lower electrode 8a through the via hole 9d. Therefore, charge generated in the piezoelectric bimorph detector 11 can be measured efficiently by measuring charge between the upper electrode 4a and the intermediate electrode 6a.

As shown in FIG. 7, deformation of the piezoelectric bimorph detector 11 and deformation of the piezoelectric bimorph detector 12 provided on an opposite side on the X-axis across the weight 3 are in opposite directions. That is, charge generated between the upper electrode 4a and the intermediate electrode 6a of the piezoelectric bimorph detector 11 and charge generated between the upper electrode 4a and the intermediate electrode 6a of the piezoelectric bimorph detector 12 have the same absolute value and reverse signs.

When the force Fx is applied in the X-axis direction, charge is generated between the electrodes of the piezoelectric bimorph detectors 11 and 12 disposed along the X-axis. Contrary to this, no charge is generated between the electrodes of the piezoelectric bimorph detectors 13 and 14 disposed along the Y-axis. As shown in FIG. 1, the piezoelectric bimorph detectors 13 and 14 are disposed beyond the positive area and negative area of the X-axis. Consequently, the deformations of the piezoelectric bimorph detectors 13 and 14 become antisymmetrical with respect to the Y-axis. Thus, charge generated in the positive area of the X-axis is offset by charge generated in the negative area of the X-axis, thereby entirely producing no charge.

On the other hand, when an acceleration in the Y-axis is applied to the weight 3, the force Fy in the Y-axis direction is generated in the gravity center G of the weight 3. In this case, the same phenomenon occurs as when the acceleration in the X-axis direction is applied. In this case, charge is generated between the electrodes of the piezoelectric bimorph detectors 13 and 14 disposed along the Y-axis, while no charge is generated between the electrodes of the piezoelectric bimorph detectors 11 and 12 disposed beyond the positive and negative areas of the Y-axis.

Next, when the acceleration in the Z-axis direction is applied to the weight 3, the force Fz in the Z-axis direction is applied to the gravity center G of the weight 3. As shown in FIG. 9, the weight 3 is pulled in the Z-axis direction by this force Fz, so that the piezoelectric bimorph detectors 15, 17 are deformed. The deformations of the piezoelectric bimorph detectors 15, 17 are substantially the same as the deformation in FIG. 8 already described, thereby generating charges having the polarities shown in FIG. 8. That is, positive charges are generated in the upper electrode 4a, the lower electrode 8a and the intermediate electrode 6b, and negative charges are generated in the intermediate electrode 6a, the upper electrode 4b and the lower electrode 8b. In this case, identical charges are generated in all the piezoelectric bimorph detectors 11 to 18.

When the accelerations in the X-axis, Y-axis and Z-axis directions are applied to the weight 3, charges are generated in the respective piezoelectric bimorph detectors 11 to 18 in their specific styles in each case. The amount of the generated charges is a quantity relating to the magnitude of an applied acceleration and the polarity of the generated charge is determined depending on the direction of the applied acceleration. For example, if a force −Fx in the negative direction of the X-axis is applied to the gravity center G in FIG. 7, the signs of the charges generated in each electrode are reversed. Likewise, if a force −Fz in the negative direction of the Z-axis is applied to the gravity center G in FIG. 9, the signs of the charges generated in the respective electrodes are reversed. Accordingly, by detecting charges generated in the respective piezoelectric bimorph detectors 11 to 18, accelerations in respective axis directions of the X-axis, Y-axis and Z-axis can be detected.

Next, a detection circuit for detecting an actual acceleration using the above-described accelerometer will be described. FIG. 11A shows a detection circuit for detecting the force Fx in the X-axis direction. The upper electrode 4a and the intermediate electrode 6a of the piezoelectric bimorph detector 11 and the upper electrode 4a and the intermediate electrode 6a of the piezoelectric bimorph detector 12 are connected in series in reverse phase. FIG. 11B shows a detection circuit for detecting the force Fy in the Y-axis direction. The upper electrode 4a and the intermediate electrode 6a of the piezoelectric bimorph detector 13 and the upper electrode 4a and the intermediate electrode 6a of the piezoelectric bimorph detector 14 are connected in series in reverse phase. FIG. 11C is a circuit diagram showing a detection circuit for detecting the force Fz in the Z-axis direction. The upper electrodes 4a and the intermediate electrodes 6a of the piezoelectric bimorph detectors 15 to 18 are connected in series all in positive phase.

FIG. 12 is a table showing schematically the polarity and quantity of charges generated in the upper electrodes 4a of the respective piezoelectric bimorph detectors 11 to 18 when the forces Fx, Fy and Fz in the respective axis directions are applied to the weight 3. As shown in FIG. 12, the forces Fx, Fy, Fz applied to the weight 3 are represented on a row and the piezoelectric bimorph detectors 11 to 18 are represented on a column. For example, the polarity signs of a column Fx in this table correspond to the signs of the upper electrodes 4a of the piezoelectric bimorph detectors 11 to 18 when the force Fx is applied to the weight. The quantity of the signs indicates the magnitude of generated charge relatively. As described above, charge with a reverse sign to the upper electrode 4a is generated in the intermediate electrodes 6a of the piezoelectric bimorph detectors 11 to 18.

A detection circuit for detecting the force Fx in the X-axis direction shown in FIG. 11A will be described with reference to FIG. 12. A case where the force Fx in the X-axis direction is generated in the weight 3 will be considered with reference to the column Fx of FIG. 12. In this case, apparently, positive charge is generated on an electrode on the terminal Ax side in the circuit diagram of FIG. 11A and negative charge is generated on an electrode on the terminal Bx side. Conversely when a force −Fx is applied, the polarities are reversed, so that negative charge is applied to the terminal Ax while positive charge is applied to the terminal Bx. Thus, a voltage Vx between the terminal Ax and the terminal Bx is a value corresponding to the force Fx in the X-axis direction.

Next, a voltage Vx when the force Fy in the Y-axis direction is applied is considered. If the force Fy is applied as shown in the column Fy of FIG. 12, no charge is generated in the electrodes of the piezoelectric bimorph detectors 11, 12. This is because, as described before, the piezoelectric bimorph detectors 11, 12 are disposed across the X-axis and when the force Fy in the Y-axis direction is applied, charges generated in the positive area of the Y-axis and the negative area of the Y-axis of the piezoelectric bimorph detectors 11, 12 are offset by each other. Thus, the voltage Vx is never affected by the force Fy in the Y-axis direction.

Next, a voltage Vx in the case where the force Fz in the Z-axis direction is applied is considered. Positive charge is generated in the upper electrodes 4a of the piezoelectric bimorph detectors 11, 12. However, because the electrodes of the piezoelectric bimorph detectors 11, 12 are connected in series in reverse phase, positive and negative charges are offset by each other so that no voltage Vx is generated. Thus, the voltage Vx is not affected by the force Fz in the Z-axis direction.

In conclusion, when a three-dimensional force F is applied to the weight 3, only the X-axis direction component Fx is detected as the voltage Vx and this detection value is never affected by the Y-axis direction component Fy or the Z-axis direction component Fz.

FIG. 11B shows a detection circuit for detecting the force Fy in the Y-axis direction. Like the above-described detection circuit for detecting the force Fx in the X-axis direction, when the three-dimensional force F is applied to the weight 3, only the Y-axis direction component Fy is detected as the voltage Vy and that detection value is never affected by the X-axis direction component Fx or the Z-axis direction component Fz.

Next, a detection circuit for detecting the force Fz in the Z-axis direction as shown in FIG. 11C will be described with reference to FIG. 12. Considering a case where the force Fz in the Z-axis direction is applied with reference to the column Fz of FIG. 12, positive charge is generated on the terminal Az side in FIG. 11C while negative charge is generated on the terminal Bz side. When a force −Fz is applied, the polarity is reversed, so that negative charge is generated on the terminal Az side while positive charge is generated on the terminal Bz side. That is, the voltage Vx between the terminal Az and the terminal Bz turns to a value corresponding to the force Fz in the Z-axis direction.

As shown in the column Fx of FIG. 12, when the force Fx is applied to the weight 3, positive charge is generated in the upper electrodes 4a of the piezoelectric bimorph detectors 15, 16 and negative charge is generated in the upper electrodes 4a of the piezoelectric bimorph detectors 17, 18. However, because the piezoelectric bimorph detectors 15 to 18 are connected in series all in positive phase, the positive and negative charges are offset by each other so that no voltage Vz is generated between the terminal Az and the terminal Bz. Thus, the voltage Vz is never affected by the force Fx in the X-axis direction.

When the force Fy in the Y-axis direction is applied, no voltage Vz is generated between the terminal Az and the terminal Bz like when the force Fx in the X-axis direction is applied. Thus, the voltage Vz is never affected by the force Fy in the Y-axis direction.

In conclusion, when the three-dimensional force F is applied to the weight 3, only the Z-axis direction component Fz thereof is detected as the voltage Vz and this detection value is never affected by the X-axis direction component Fx or the Y-axis direction component Fy.

As described above, the force Fx in the X-axis direction is detected by the two piezoelectric bimorph detectors 11, 12 disposed along the X-axis and the force Fy in the Y-axis direction is detected by the two piezoelectric bimorph detectors 13, 14 disposed along the Y-axis. Then, the force Fz in the Z-axis direction is detected by the four piezoelectric bimorph detectors 15 to 18 disposed radiantly around the home position O. That is, the accelerometer of the first embodiment can detect an acceleration of each component of the three dimensions even if the acceleration is applied in an arbitrary direction.

In the meantime, the detection circuit for detecting the forces Fx, Fy, Fz acting on the weight 3 are not restricted to the above-mentioned ones. For example, by connecting the electrodes of the piezoelectric bimorph detectors 11, 12 in positive phase, the force Fz in the Z-axis direction can be detected by means of the piezoelectric bimorph detectors 11, 12. If the electrodes of the piezoelectric bimorph detectors 15, 18 are connected in positive phase and the electrodes of the piezoelectric bimorph detectors 16, 17 are connected in positive phase while these two pairs are connected in reverse phase, the force Fx in the X-axis direction can be detected by the piezoelectric bimorph detectors 15 to 18.

Here, a comparative example having the same structure as the first embodiment except that the shape of that piezoelectric bimorph detector is linear will be described. Consequently, differences in influences of the residual stress originating from differences in the shape of the piezoelectric bimorph detector can be investigated.

Figure 13:
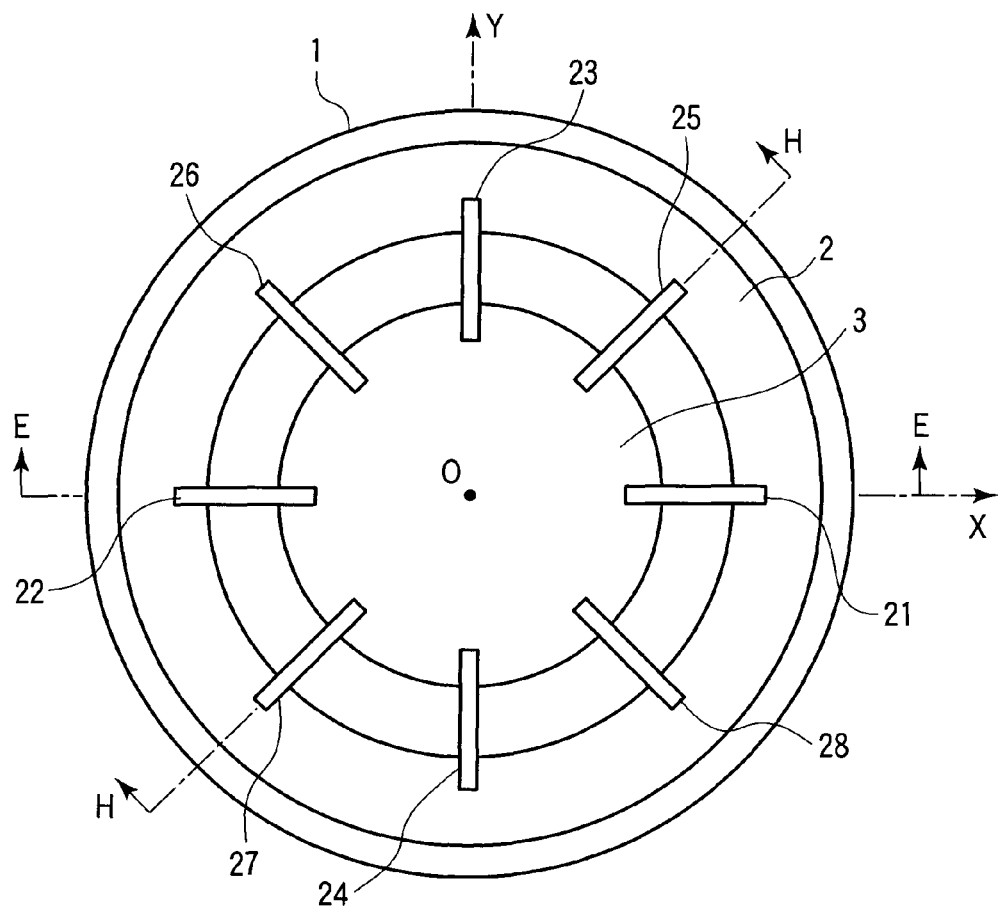
FIG. 13 is a top view showing schematically an accelerometer of a first comparative example.
Figure 14:
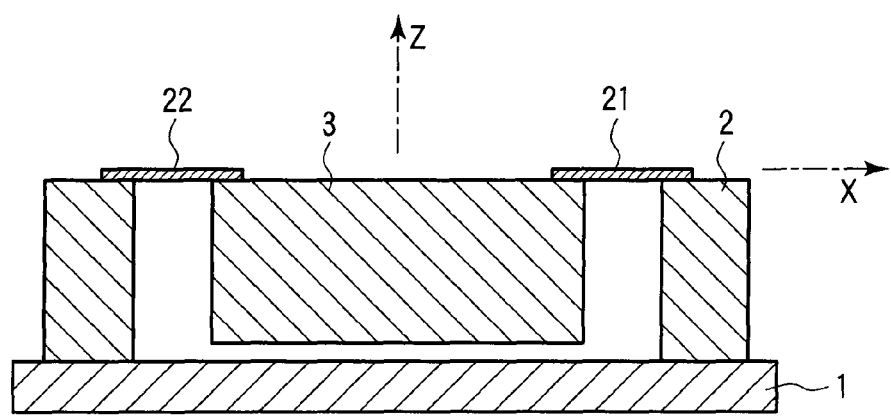
FIG. 14 is a sectional view taken along the line E-E of the accelerometer shown in FIG. 13.

FIG. 13 is a top view showing schematically the accelerometer of the comparative example. FIG. 14 shows a sectional view of a sensor taken along the line E-E in FIG. 13. This sensor is the same as the first embodiment except that eight piezoelectric bimorph detectors 21 to 28 have each linear shape. Like reference numerals are attached to the same components and then, only different points will be described.

Figure 15:
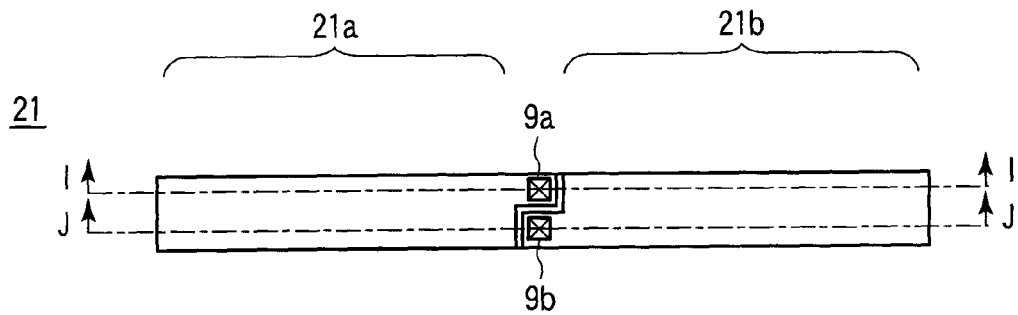
FIG. 15 is a plan view showing schematically the piezoelectric bimorph detector shown in FIG. 13.
Figure 16:
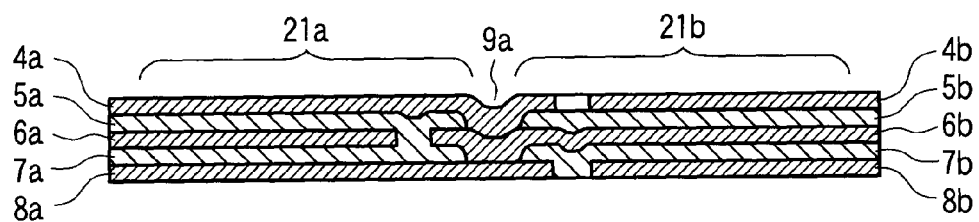
FIG. 16 is a sectional view taken along the line I-I of the piezoelectric bimorph detector shown in FIG. 15.
Figure 17:
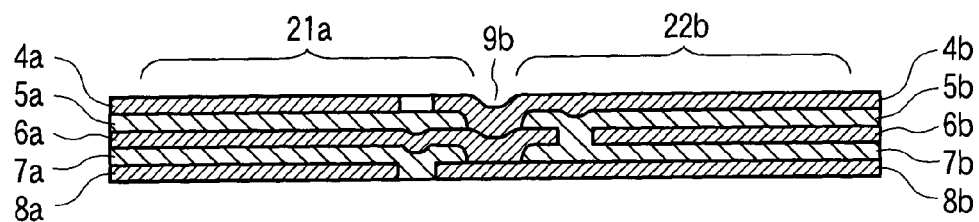
FIG. 17 is a sectional view taken along the line J-J of the piezoelectric bimorph detector shown in FIG. 15.

As shown in FIG. 13, the piezoelectric bimorph detectors 21 to 28 for connecting the base 2 with the weight 3 are disposed symmetrically with respect to the X-axis and the Y-axis on the top surface of the base 2. The piezoelectric bimorph detectors 21 to 28 have an identical structure. A piezoelectric bimorph detector, for example, the piezoelectric bimorph detector 21 is shown in FIGS. 15 to 17. The structure of this piezoelectric bimorph detector 21 will be described with reference to FIGS. 15 to 17. FIG. 15 is a top view showing schematically the piezoelectric bimorph detector 21. FIG. 16 is a sectional view taken along the line I-I in FIG. 15 and FIG. 17 is a sectional view taken along the line J-J in FIG. 5.

As shown in FIGS. 15 to 17, the piezoelectric bimorph detector 21 is constituted of a linear first portion 21a and a linear second portion 21b. The first portion 21a and the second portion 21b of the piezoelectric bimorph detector 21 has a laminated structure in which the upper electrodes 4a, 4b, the upper piezoelectric films 5a, 5b, the intermediate electrodes 6a, 6b, the lower piezoelectric films 7a, 7b and the lower electrodes 8a, 8b are stacked. Here, the first portion 21a of the piezoelectric bimorph detector 21 corresponds to a portion connected to the weight 3 and the second portion 21b corresponds to a portion connected to the base 2. The first portion 21a and the second portion 21b of each electrode are not in contact with each other. That is, the upper electrode 4a and the upper electrode 4b, the intermediate electrode 6a and the intermediate electrode 6b, and the lower electrode 8a and the lower electrode 8b are not connected to each other respectively electrically. As shown in FIG. 16, the upper electrode 4a and the lower electrode 8a of the first portion 21a are connected to the intermediate electrode 6b of the second portion 21b through the via hole 9a. Further, as shown in FIG. 17, the intermediate electrode 6a of the first portion 21a is connected to the upper electrode 4b and the lower electrode 8b of the second portion 21b through the via hole 9b. The upper piezoelectric films 5a, 5b and the lower piezoelectric films 7a, 7b are formed to have a polarization in the Z-axis direction.

Figure 18:
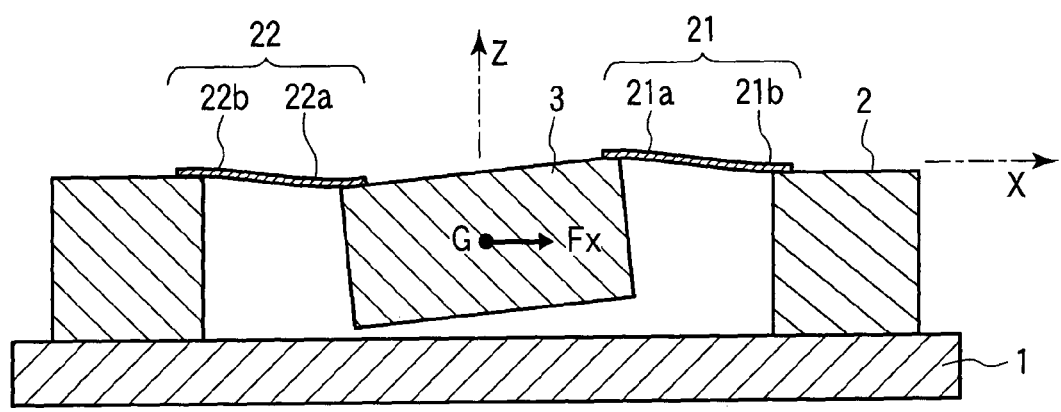
FIG. 18 is a sectional view showing schematically the accelerometer along the line H-H shown in FIG. 13 or a schematic sectional view showing a state in which the force Fx in the X-axis direction is applied.
Figure 19:
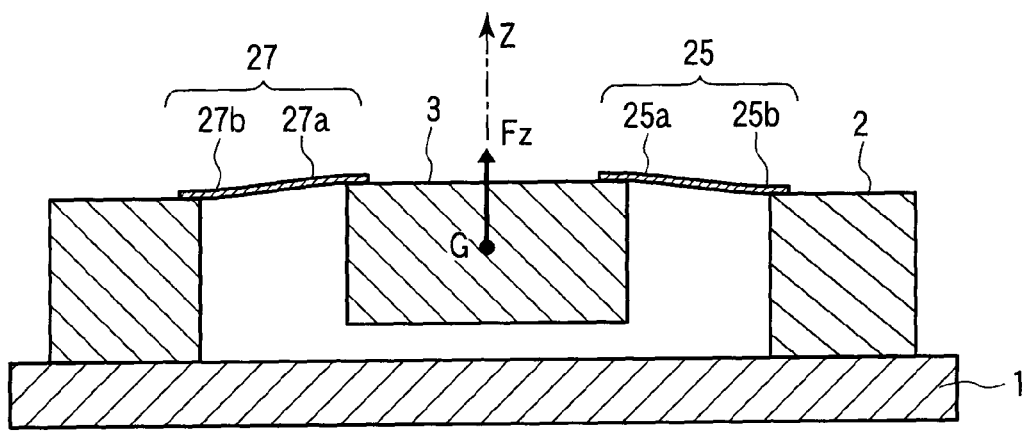
FIG. 19 is a schematic sectional view showing a state in which the force Fz in the Z-axis direction is applied to the accelerometer disposed along the line H-H in FIG. 13.

FIG. 18 shows a sectional view of the sensor taken along the line E-E in FIG. 13 when an acceleration in the X-axis direction is applied to the weight 3. FIG. 19 shows a sectional view of the sensor taken along the line H-H of FIG. 13 when the acceleration in the Z-axis direction is applied to the weight 3. When the acceleration in the X-axis direction is applied to the weight 3, the piezoelectric bimorph detectors 21, 22 are deformed as shown in FIG. 18. That is, the first portion 21a of the piezoelectric bimorph detector 21 is flexed upward while the second portion 22b is flexed downward. The first portion 22a of the piezoelectric bimorph detector 22 is flexed downward while the second portion 22b is flexed upward. When the acceleration in the Z-axis direction is applied to the weight 3, the piezoelectric bimorph detectors 25, 27 are deformed as shown in FIG. 19. This deformation is basically the same as the first embodiment, producing identical charges.

The most prominent difference between this comparative example and the first embodiment exists in the extent of influences of the residual stress of the piezoelectric film. Because in this comparative example, the weight 3 and the base 2 are connected directly by the linear piezoelectric bimorph detectors 21 to 28, the residual stress generated in the piezoelectric bimorph detectors 21 to 28 affect the detection sensitivity of the piezoelectric bimorph detectors 21 to 28 directly.

Figure 20:
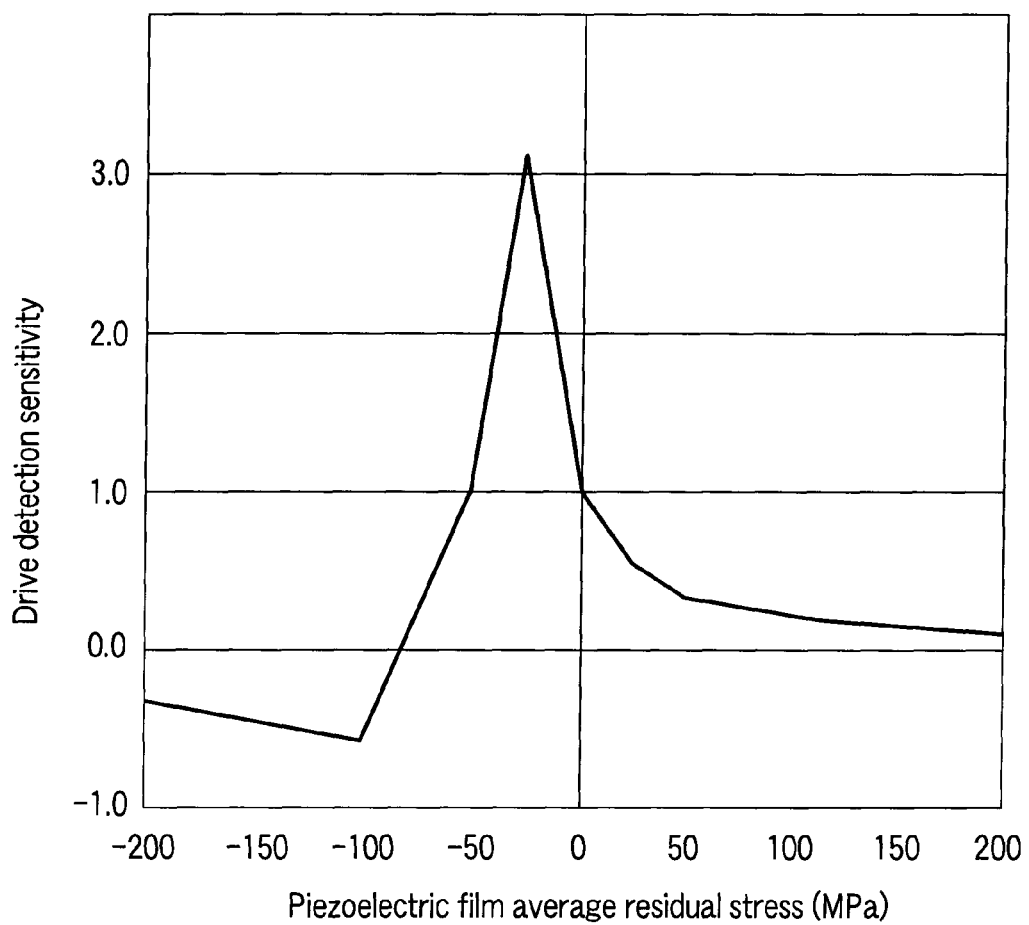
FIG. 20 is a graph showing a result of simulation about the drive detection sensitivity of the piezoelectric bimorph detector when residual stress exists on the piezoelectric film of the piezoelectric bimorph detector shown in FIG. 13.

The accelerometer of this comparative example includes the linear piezoelectric bimorph detectors 21 to 28 as described above. FIG. 20 shows a result of simulation carried out on the piezoelectric bimorph detectors 21 to 28, according to the finite element method based on specific response in the case where residual stress exists in the piezoelectric film. In the piezoelectric bimorph detectors 21 to 28 for use in the simulation, the upper electrodes 4a, 4b, the intermediate electrodes 6a, 6b and the lower electrodes 8a, 8b are formed of aluminum (Al) having a thickness of 0.2 μm and the upper piezoelectric films and the lower piezoelectric films are formed of aluminum nitride (AlN) having a thickness of 1 μm. FIG. 20 shows the detection sensitivities of the piezoelectric bimorph detectors 21 to 28 with respect to the average residual stress of the upper piezoelectric film and the lower piezoelectric film as a ratio of the detection sensitivity in the case where no residual stress exists.

As evident from FIG. 20, if the tensile residual stress exists in the piezoelectric bimorph detectors 21 to 28, the deformation of the piezoelectric bimorph detectors 21 to 28 is suppressed rapidly. Consequently, the sensitivity is reduced to about 15% by the tensile stress of 200 MPa. On the other hand, buckling phenomenon of the piezoelectric bimorph detectors 21 to 28 is generated by existence of the compressed residual stress, so that the sensitivity becomes very unstable and hysteresis characteristic is represented to the acceleration although not shown in the Figure. If the linear piezoelectric bimorph detectors 21 to 28 are used, no stable detection sensitivity can be obtained due to a slight change of the residual stress. This cannot be corrected by calibration of a detection circuit. Consequently, it can be understood that the problem of the residual stress can be avoided by forming the piezoelectric bimorph detectors 21 to 28 into a shape in which the ring-like portion and the linear portion are combined.

In the accelerometer of the first embodiment of the present invention, the weight 3 and the base 2 are connected directly through the piezoelectric bimorph detectors 11 to 18. The detection sensitivity is improved by this structure. As a result, a high precision detection can be attained even if the mass and dimension of the weight 3 are reduced, thereby leading to reduction of the size of the sensor. Further, the piezoelectric film can be formed with the members such as AlN and ZnO whose piezoelectric constant has a small temperature dependency, thereby the acceleration can be detected at a high precision without a necessity of the temperature compensation. Further, by forming the piezoelectric bimorph detectors 11 to 18 into a flexural shape, the influence on the detection sensitivity by the residual stress, which is unavoidable when the piezoelectric film is formed according to the film formation method, can be reduced significantly. The piezoelectric bimorph detectors 11 to 18 are disposed symmetrically with respect to the X-axis and the Y-axis so as to detect each component of the acceleration.

Second Embodiment

The basic principle of the angular rate sensor will be described prior to a detailed description of the angular rate sensor according to the second embodiment of the present invention.

Figure 21:
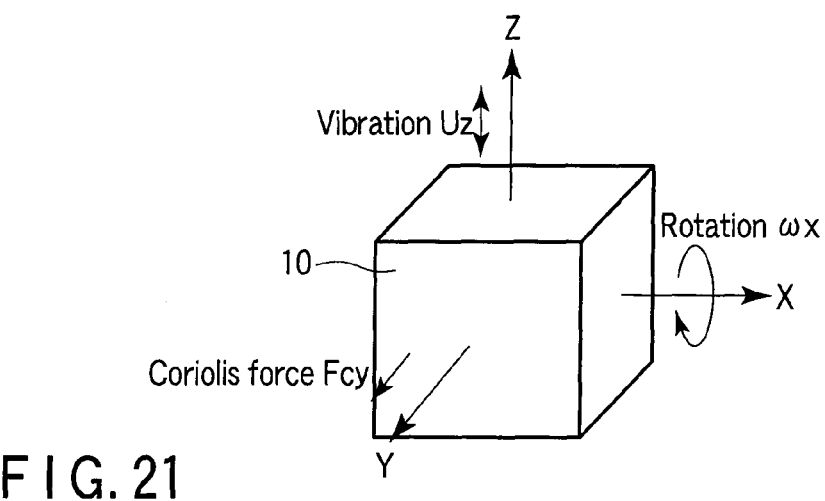
FIG. 21 is a diagram for explaining the principle of detecting the angular rate applied to an oscillator.

The angular rate sensor of the present invention detects an angular rate using the Coriolis force acting on the weight 3. The basic principle of detecting the angular rate by detecting the Coriolis force will be described with reference to FIG. 21. Now assume that an oscillator 10 is placed at the home position of a XYZ three-dimensional coordinate system. This oscillator 10 corresponds to the weight 3 in the sensor of the present invention. To detect the angular rate ωx around the X-axis of this oscillator 10, a vibration Uz in the Z-axis direction is applied to this oscillator 10 as shown in FIG. 21 and then, a Coriolis force Fcy generated in the Y-axis direction is measured. The Coriolis force Fcy generated in the oscillator 10 is expressed in the following expression:

$$Fcy = 2m \cdot vz \cdot \omega x$$

where m is a mass of the oscillator 10, vz is an instantaneous velocity in the vibration direction (Z-axis direction) of the oscillator 10 and ωx is an instantaneous angular rate around the X-axis of the oscillator 10. To detect the angular rate ωy around the Y-axis of this oscillator 10, a Coriolis force Fcx generated in the X-axis direction is measured. To detect the angular rate of the X-axis and the Y-axis, a mechanism for vibrating the oscillator 10 in the Z-axis direction, a mechanism for detecting the Coriolis force Fcx in the X-axis direction applied to the oscillator 10 and a mechanism for detecting the Coriolis force Fcy in the Y-axis direction are required. The velocity of the oscillator 10 can be calculated from an output of the vibration mechanism.

FIG. 22 is a top view showing schematically a biaxial angular rate sensor according to the second embodiment of the present invention. FIG. 23 shows a sectional view of the sensor taken along the line K-K in FIG. 22.

This angular rate sensor includes a sheet-like base plate 1, a ring-like or frame-like supporting base 2 which is provided and fixed to the top surface of the base plate 1, having a supporting surface in which a driving portion is formed, a rectangular weight 3 disposed on the central area of the base plate 1 within the ring-like base 2, eight piezoelectric bimorph detectors 31 to 38 having a flexural shape, each end of which is connected to the base 2 while the other end thereof is connected to the weight 3, and eight piezoelectric bimorph exciters 41 to 48 having a flexural shape, each end of which is connected to the base 2 while the other end thereof is connected to the weight 3.

In this specification, a home position O is set in the center of this base 2 and the X-axis, the Y-axis and the Z-axis are set in the arrow directions of FIGS. 22 and 23 to define a XYZ three-dimensional coordinate system considering convenience for description. The XY plane is a plane (virtual surface) parallel to the top surface of the base 2 and the Z-axis is extended from an intersection of the X-axis and the Y-axis (home position O), serving as an axis perpendicular to this plane.

As shown in FIG. 22, a pair of piezoelectric bimorph detectors 31, 32 and a pair of piezoelectric bimorph detectors 33, 34 are formed symmetrically with respect to the X-axis passing between the both of each pair and each piezoelectric bimorph detector includes a straight portion extending along the X-axis and a bent portion which is extended from the straight portion in the Y-axis direction such that it is bent into a hairpin shape. A pair of piezoelectric bimorph detectors 35, 36 and a pair of piezoelectric bimorph detectors 37, 38 are formed symmetrically with respect to the Y-axis passing between both of each pair and each piezoelectric bimorph detector includes a straight portion extended along the Y-axis and a bent portion which is extended from the straight portion in the X-axis direction such that it is bent into a hairpin shape. To connect the supporting surface of the base 2 with the top surface of the weight 3, the piezoelectric bimorph detectors 31, 32 and the piezoelectric bimorph detectors 33, 34 are disposed in the positive area and the negative area of the X-axis, respectively, along the X-axis. The piezoelectric bimorph detectors 35, 36 and the piezoelectric bimorph detectors 37, 38 are disposed in the positive area and the negative area of the Y-axis, respectively, along the Y-axis. The piezoelectric bimorph detectors 31 to 34 are provided to detect a Coriolis force in the X-axis direction and the piezoelectric bimorph detectors 35 to 38 are provided to detect the Coriolis force in the Y-axis direction. The piezoelectric bimorph detectors 31, 34, 36, 37 are formed in the same size and in the same shape and the piezoelectric bimorph detectors 32, 33, 34, 35 are formed in the same size and in the same shape.

To connect the supporting surface of the base 2 with the top surface of the weight 3, eight piezoelectric bimorph exciters 41 to 48 are disposed. A pair of the piezoelectric bimorph exciters 41, 42 and a pair of the piezoelectric bimorph exciters 43, 44 are formed symmetrically with respect to the X-axis passing between those pairs such that they are disposed with an interval along the Y-direction, and each piezoelectric bimorph exciter includes a straight portion extended along the X-axis and a bent portion which is extended in the Y-axis direction from the straight portion such that it is bent into the hairpin shape. A pair of the piezoelectric bimorph exciters 45, 46 and a pair of the piezoelectric bimorph exciters 47, 48, are formed symmetrically with respect to the Y-axis passing between those pairs such that they are disposed with an interval along the X-axis. Each piezoelectric bimorph exciter includes a straight portion extended along the Y-axis and a bent portion which is extended in the X-axis direction from the straight portion such that it is bent into the hairpin shape. The piezoelectric bimorph exciters 41, 44, 46 and 48 are formed in the same size and in the same shape and the piezoelectric bimorph exciters 42, 43, 45, 47 are formed in the same size and in the same shape. These piezoelectric bimorph exciters 41 to 48 are provided to vibrate the weight 3 in the Z-axis direction. The aforementioned piezoelectric bimorph detectors 31 to 38 and piezoelectric bimorph exciters 41 to 48 have four bent portions within the X-Y plane as shown in FIG. 24.

In the meantime, the piezoelectric bimorph detectors 31 to 38 and the piezoelectric bimorph exciters 41 to 48 only need to have at least one planar bent portion within the X-Y plane and a shape in which the ring-like portion and the linear portion are combined with each other as shown in FIG. 3 may be used.

The structures of the piezoelectric bimorph detectors 31 to 38 and the piezoelectric bimorph exciters 41 to 48 will be described in detail. The piezoelectric bimorph detectors 31 to 38 and the piezoelectric bimorph exciters 41 to 48 have the same structure. FIGS. 24 to 26 show the structure of a piezoelectric bimorph exciter, for example, the piezoelectric bimorph exciter 42. The structure of this piezoelectric bimorph exciter 42 will be described with reference to FIGS. 24 to 26. FIG. 24 is a top view showing schematically the piezoelectric bimorph exciter 42. FIG. 25 is a sectional view of the sensor taken along the line N-N in FIG. 24 and FIG. 26 is a sectional view of the sensor taken along the line P-P in FIG. 24.

As shown in FIG. 24, the piezoelectric bimorph exciter 42 is constituted of a substantially L-shaped first portion 42a and a substantially L-shaped second portion 42b. The first portion 42a and the second portion 42b of the piezoelectric bimorph exciter 42 has a laminated structure in which a pair of upper electrodes 4a, 4b, a pair of upper piezoelectric films 5a, 5b, a pair of intermediate electrodes 6a, 6b, a pair of lower piezoelectric films 7a, 7b and a pair of lower electrodes 8a, 8b are stacked. In the first portion 42a and the second portion 42b, their respective electrodes are not formed to be extended continuously but formed not to be in physical contact with each other, as shown in FIGS. 25 and 26. That is, the upper electrode 4a and the upper electrode 4b, the intermediate electrode 6a and the intermediate electrode 6b, and the lower electrode 8a and the lower electrode 8b are not connected with each other respectively electrically. As shown in FIG. 25, the upper electrode 4a and the lower electrode 8a of the first portion 42a are connected electrically to the intermediate electrode 6b of the second portion 42b through the via hole 9b. As shown in FIG. 26, the intermediate electrode 6a of the first portion 42a is connected electrically to the upper electrode 4b and the lower electrode 8b of the second portion 42b through the via hole 9d. The upper piezoelectric films 5a, 5b and the lower piezoelectric films 7a, 7b are formed to have a polarization in the Z-axis direction.

Generally, the piezoelectric device has a characteristic that when a voltage is applied to the piezoelectric device from outside, a pressure is generated in a predetermined direction within the piezoelectric device. FIG. 27 shows a section of the piezoelectric bimorph exciter 42 taken along the line M-M in FIG. 24. Which phenomenon occurs when a voltage is applied between the electrodes of the piezoelectric bimorph exciter 42 will be described with reference to FIG. 27. When a positive voltage is applied to the upper electrode 4a of the piezoelectric bimorph exciter 42 and a negative voltage is applied to the intermediate electrode 6a, a compressed stress is generated in the thickness direction (Z-axis direction) and a tensile stress is generated in the X-axis and Y-axis directions because the lower piezoelectric film 5a is polarized in the Z-axis direction. When a negative voltage is applied to the intermediate electrode 6a and a positive voltage is applied to the lower electrode 8a, a tensile stress is generated in the thickness direction and a compressed stress is generated in the X-axis direction and the Y-axis direction because the lower piezoelectric film 7a is polarized in the Z-axis direction. Thus, the first portion 42a of the piezoelectric bimorph exciter 42 is flexed in a positive direction of the Z-axis. On the other hand, the upper electrode 4b, the intermediate electrode 6b and the lower electrode 8b of the second portion 42b are flexed in a negative direction of the Z-axis because they are connected to the first portion in reverse phase.

FIG. 28 shows the section of a sensor taken along the line K-K in FIG. 22 when the weight 3 is vibrated by the piezoelectric bimorph exciters 41 to 48. The piezoelectric bimorph exciter 43 provided at a symmetrical position to the piezoelectric bimorph exciter 42 on the Y-axis is deformed symmetrically to the piezoelectric bimorph exciter 42 when a positive voltage is applied to the upper electrode 4a and a negative voltage is applied to the intermediate electrode 6a. That is, the piezoelectric bimorph exciters 42, 43 are deformed as shown in FIG. 28. As a result, the weight 3 is displaced in a positive direction of the Z-axis. When the polarity of a voltage supplied to the upper electrode 4a and the intermediate electrode 6a is reversed, the expansion and contraction of the piezoelectric bimorph exciters 42, 43 is reversed so that the weight 3 is displaced in a negative direction of the Z-axis. By reversing the polarity of a supplied voltage alternately so that these two displacement states occur alternately, the weight 3 can be reciprocated in the Z-axis direction. In other words, a vibration Uz in the Z-axis direction can be applied to the weight 3.

Such a voltage supply can be achieved by applying AC signals between opposed electrodes. Although in the above description, AC voltage is applied between the upper electrode 4a and the intermediate electrode 6a of the piezoelectric bimorph exciters 42, 43, the weight 3 can be vibrated symmetrically with respect to the X-axis and the Y-axis in the Z-axis direction efficiently by applying AC voltage between the upper electrodes 4a and the intermediate electrodes 6a of all the piezoelectric bimorph exciters 41 to 48. FIG. 29 shows wiring of the respective piezoelectric bimorph exciters 41 to 48 to a AC power supply.

The velocity in a vibration direction of the weight 3 necessary for calculating the angular rate can be calculated from the frequency and amplitude of AC voltage to be applied to the piezoelectric bimorph exciters 41 to 48.

Next, a Coriolis force detecting mechanism in the angular rate sensor of the second embodiment will be described. The Coriolis force detecting mechanism is basically the same as the acceleration detecting mechanism of the first embodiment.

In detection of the angular rate, first, the weight 3 is vibrated in the Z-axis direction by the aforementioned vibrating mechanism. When an angular rate acts around the X-axis during vibration of the weight 3, the Coriolis force Fcy is applied in the Y-axis direction as described above. The behavior of the sensor in this case will be described with reference to FIG. 30. FIG. 30 shows a sectional view of the sensor taken along the line L-L in FIG. 22. The weight 3 is fixed to the base 2 by piezoelectric bimorph detectors 35 to 38 (36 and 37 are not shown in FIG. 31) for detecting a stress in the Y-axis direction, the top surface of which is disposed along the Y-axis. Thus, a counterclockwise moment is generated by this force Fcy, so that the piezoelectric bimorph detectors 35, 38 are deformed as shown in FIG. 30. That is, a first portion 35a of the piezoelectric bimorph detector 35 is flexed upward and the second portion 35b is flexed downward. A first portion 38a of the piezoelectric bimorph detector 38 is flexed downward while a second portion 38b is flexed upward.

A stress and piezoelectric action generated in the piezoelectric bimorph detector 35 will be described in detail with reference to FIG. 31. That is, when the first portion 35a is flexed upward, a tensile force is applied to the upper piezoelectric film 5a so that positive charge is generated in the upper electrode 4a and negative charge is generated in the intermediate electrode 6a. Compression force is applied to the lower piezoelectric film 7a so that negative charge is generated in the intermediate electrode 6a and positive charge is generated in the lower electrode 8a.

When the second portion 35b is flexed downward, compression force is applied to the upper piezoelectric film 5b, so that negative charge is generated in the upper electrode 4b and positive charge is generated in the intermediate electrode 6b. Tensile force is applied to the lower piezoelectric film 7b, so that positive charge is generated in the intermediate electrode 6b and negative charge is generated in the lower electrode 8b. On the other hand, the upper electrode 4a and the lower electrode 8a are connected to the intermediate electrode 6b through the via hole 9a and the intermediate electrode 6a is connected to the upper electrode 4b and the lower electrode 8a through the via hole 9b. As a result, by measuring charges between the upper electrode 4a and the intermediate electrode 6a, charges generated in the piezoelectric bimorph detector 35 can be measured efficiently.

As shown in FIG. 30, deformations of the piezoelectric bimorph detector 35 and the piezoelectric bimorph detector 38 provided on opposite sides on the X-axis across the weight 3 are in reverse directions if considering the axial symmetry. Thus, charge generated between the upper electrode 4a and the intermediate electrode 6a of the piezoelectric bimorph detector 35 and charge generated between the upper electrode 4a and the intermediate electrode 6a of the piezoelectric bimorph detector 38 have the same absolute value and reverse signs.

FIG. 32 shows an example of a measuring circuit for detecting the Coriolis force Fcy generated in the Y-axis. The upper electrode 4a and the intermediate electrode 6a of the piezoelectric bimorph detector 35 and the upper electrode 4a and the intermediate electrode 6a of the piezoelectric bimorph detector 36 are connected in phase. The upper electrode 4a and the intermediate electrode 6a of the piezoelectric bimorph detector 37 and the upper electrode 4a and the intermediate electrode 6a of the piezoelectric bimorph detector 38 are connected to a terminal Ay and a terminal By in series in reverse phase. By measuring a voltage Vy between the terminal Ay and the terminal By, the Coriolis force Fcy can be detected.

While the weight 3 is vibrated along the Z-axis direction, the angular rate acts around the Y-axis and even if the Coriolis force Fcx is generated in the X-axis, a small amount of charges is generated between the upper electrodes 4a and the intermediate electrodes 6a of the piezoelectric bimorph detectors 35 to 38. The amount of charges generated at this time is proportional to a distance from the Y-axis of the respective piezoelectric bimorph detectors 35 to 38 and the polarity is reverse in the positive area and negative area of the X-axis. Thus, if the upper electrode 4a and the intermediate electrode 6a of the piezoelectric bimorph detectors 35 to 38 are connected as shown in the circuit diagram of FIG. 32, the amounts of charges of the piezoelectric bimorph detectors 35 to 38 are equal and the polarity of the piezoelectric bimorph detectors 35 and 38 is reverse to the polarity of the piezoelectric bimorph detectors 36 and 37. Consequently, the charges are offset by each other thereby producing no voltage.

The weight 3 is vibrated in the Z-axis direction so as to produce a large charge in the piezoelectric bimorph detectors 35 to 38. The amount of charges generated at this time and the polarity are equal in the respective piezoelectric bimorph detectors 35 to 38. Thus, if the upper electrodes 4a and the intermediate electrodes 6a of the piezoelectric bimorph detectors 35 to 38 are connected as shown in FIG. 32, that is, the piezoelectric bimorph detectors 35, 36 and the piezoelectric bimorph detectors 37, 38 are connected in reverse phase, the charges are offset by each other thereby producing no voltage Vy.

Charges are generated in the piezoelectric bimorph detectors 35 to 38 by an acceleration Fy in the Y-axis direction as shown in the first embodiment. Then, the voltage Vy is detected by the detection circuit shown in FIG. 32. That is, the voltage Vy detects both the acceleration Fy acting in the Y-axis direction and the Coriolis force Fcy acting in the Y-axis direction at the same time. Thus, to detect the Coriolis force in the Y-axis direction, a voltage generated by the Coriolis force Fcy in the Y-axis direction and a voltage generated by the acceleration Fy need to be separated.

FIG. 33A shows schematically a signal processing circuit in an angular rate sensor for detecting a voltage originating from the Coriolis force and a voltage originating from the acceleration separately. The angular rate sensor includes a timing unit 100 for generating a drive signal having a predetermined frequency, an amplifying unit 103 for amplifying a detected voltage, a sampling unit 104 for acquiring a voltage signal output from the amplifying unit 103, buffers A105 and B106 for storing the voltage signal acquired by the sampling unit 104 temporarily, and an arithmetic operating unit 107 for calculating an acceleration and angular rate acting on the weight 3 from the voltage signal stored in the buffers A105 and B106. The timing unit 100 generates a drive signal having a predetermined frequency for controlling an exciting unit 101 for vibrating the weight 3 and then generates a timing signal substantially synchronous with this drive signal. This drive signal is given to the exciting unit 101 and the exciting unit 101 vibrates the weight 3 with the given frequency in the Z-axis direction. The timing signal is given to the sampling unit 104 and the sampling unit 104 controls a timing for extracting a voltage output from the amplifying unit 103. The timing unit 100 outputs a synchronous signal to the buffer A105, the buffer B106 and the arithmetic operating unit 107 in odder to synchronize the sampling unit 104 with the buffer A105, the buffer B106 and the arithmetic operating unit 107.

The exciting unit 101 corresponds to the piezoelectric bimorph exciters 41 to 48 for vibrating the weight 3 in the Z-axis direction, and vibrates the weight 3 based on a given drive signal. A sensor portion 102 is constituted of the weight 3 and a displacement detecting unit 102a. This displacement detecting unit 102a corresponds to the piezoelectric bimorph detectors 35 to 38 and the detection circuit shown in FIG. 32 for detecting a displacement of the weight 3 in the Y-axis direction. A voltage Vy detected by the displacement detecting unit 102b is amplified to an appropriate value by the amplifying unit 103 and output to the sampling unit. The sampling unit controls a timing for extracting the voltage Vy output from the amplifying unit 103 according to the timing signal given from the timing unit. The timing signal includes a timing signal delayed by $(1/2)\pi$ with respect to the phase of the drive signal to be given to the exciting unit 101 and a timing signal delayed by $(3/2)\pi$. The voltage Vy extracted according to the timing signal delayed by $(1/2)\pi$ is stored in the buffer A105 and the voltage Vy extracted according to the timing signal delayed by $(3/2)\pi$ is stored in the buffer B106.

FIG. 33B shows a phase relation among the excitation voltage which is a drive signal, the vibration in the Z-axis direction of the weight 3 and the vibration in the Y-axis direction of the weight 3 by the Coriolis force. The phase of the vibration in the Z-axis direction is delayed by $\pi/2$ with respect to the drive signal. Further, the phase of the vibration in the Y-axis direction by the Coriolis force is delayed by $\pi/2$ with respect to the vibration in the Z-axis direction. Thus, the phase of the vibration in the Y-axis direction by the Coriolis force is delayed by $\pi$ with respect to the phase of the drive signal. By extracting the voltage Vy according to the timing signal delayed by $(1/2)\pi$ with respect to the phase of the drive signal and the timing signal delayed by $(3/2)\pi$, the voltage originating from the Coriolis force and the voltage originating from the acceleration are calculated.

The voltage Vy stored in the buffer A105 and the buffer B106 is input to the arithmetic operating unit 107 so as to execute a predetermined arithmetic operation to this voltage Vy. When a difference between the voltage Vy stored in the buffer A105 and the voltage Vy stored in the buffer B106 is obtained, components originating from the acceleration are offset by each other so as to calculate the voltage Vy originating from the Coriolis force. When a sum of the voltage Vy stored in the buffer A105 and the voltage Vy stored in the buffer B106 is obtained, components originating from the Coriolis force are offset by each other so as to calculate the voltage Vy originating from the acceleration.

In the meantime, the voltage Vy originating from the Coriolis force and the voltage Vy originating from the acceleration can be separated by inputting the voltage Vy output from the detection circuit into a frequency filter. Although usually, most frequency components of the voltage Vy originating from the acceleration are less than several tens of Hz, the frequency components of the voltage Vy originating from the Coriolis force exist only in the vicinity of the frequency of a vibration for vibrating the weight 3. Usually, this vibration frequency is set to several kHz to several tens of kHz. Thus, by connecting a high-frequency pass filter having a cut-off frequency of several hundred Hz to a detection circuit, only the frequency component originating from the Coriolis force of the voltage Vy can be output.

Only the Coriolis force Fcy in the Y-axis direction can be detected by the piezoelectric bimorph detectors 35 to 38 for detecting the Coriolis force Fcy in the Y-axis direction and the detection can be attained without being affected by the Coriolis force in the X-axis direction, the vibration in the Z-axis direction and the acceleration in the Y-axis direction (of course, accelerations in the X-axis direction and the Z-axis direction).

The Coriolis force Fcx in the X-axis direction is detected by the piezoelectric bimorph detectors 31 to 34 disposed along the X-axis just in the same way as the Coriolis force Fcy in the Y-axis direction is detected by the piezoelectric bimorph detectors 35 to 38 disposed along the Y-axis. When the sensor is rotated by 90° clockwise around the home position O, the Y-axis overlaps the X-axis and the piezoelectric bimorph detectors 35 to 38 overlap the detectors 31 to 34. Thus, it is understood that the Coriolis force Fcx in the X-axis direction can be detected in the same method. As for the detection circuit, the same detection circuit as FIG. 32 is used and the piezoelectric bimorph detectors 35 to 38 are replaced with the piezoelectric bimorph detectors 31 to 34. Only the Coriolis force Fcx in the X-axis direction can be detected by the piezoelectric bimorph detectors 31 to 34 for detecting the Coriolis force Fcx in the X-axis direction and the detection can be attained without being affected by the Coriolis force in the Y-axis direction, the vibration in the Z-axis direction and the acceleration in the X-axis direction.

As described above, the angular rate sensor of the second embodiment can detect the angular rate of each component around two axes when the angular rate is applied to the weight 3. Further, accelerations acting in these two axes can be detected at the same time. The weight 3 and the base 2 are connected directly with the piezoelectric bimorph detectors 31 to 38 and the piezoelectric bimorph exciters 41 to 48. Thus, the reduction of the sensor in size can be achieved like the accelerometer of the first embodiment so as to enable detection of the acceleration without a necessity of temperature compensation.

In the angular rate sensor of the second embodiment of the present invention, the piezoelectric bimorph exciters 41 to 48 are made to function as exciters for Z-axis vibration and the piezoelectric bimorph detectors 31 to 34 are made to function as detectors for detection of the Coriolis force in the X-axis direction. The piezoelectric bimorph detectors 35 to 38 are made to function as detectors for detection of the Coriolis force in the Y-axis direction. However, the piezoelectric bimorph detectors 31 to 38 and the piezoelectric bimorph exciters 41 to 48 have the same structure, and any device can be operated as an exciter by applying a voltage and can be operated as a detector for detecting a charge generated due to deformation. Therefore, the combinations of the piezoelectric bimorph detectors 31 to 38 and the piezoelectric bimorph exciters 41 to 48 are not restricted to the second embodiment. Next, a sensor in which the combinations of the piezoelectric bimorph detectors 31 to 38 and the piezoelectric bimorph exciters 41 to 48 are changed will be described as a modification of the second embodiment. Hereinafter, the piezoelectric bimorph detector and the piezoelectric bimorph exciter are noted as the piezoelectric bimorph device.

In a first modification of the second embodiment of the present invention, the piezoelectric bimorph devices 31 to 38 are operated as exciters for Z-axis vibration, the piezoelectric bimorph devices 41 to 44 are operated as detectors for detection of the Coriolis force in the X-axis direction and the piezoelectric bimorph devices 45 to 48 are operated as detectors for detection of the Coriolis force in the Y-axis direction. FIG. 34 shows combinations of the second embodiment and the piezoelectric bimorph device of the first modification. As a circuit for excitation, the one shown in FIG. 29 may be used and as a detection circuit for detection, the one shown in FIG. 32 may be used.

In the angular rate sensor of the second embodiment of the present invention, the weight 3 is vibrated in the Z-axis direction by the piezoelectric bimorph devices 41 to 48. However, the vibration direction is not restricted to the Z-axis direction but may be X-axis direction or Y-axis direction.

Figures 38, 39:
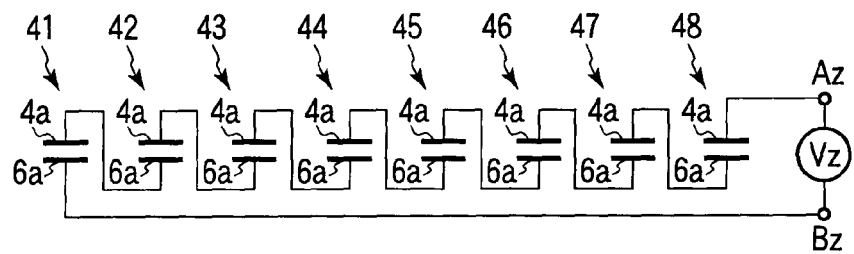
FIG. 38 is a circuit diagram showing wiring of the piezoelectric bimorph device for detecting a force applied in the Z-axis direction according to the second modification.
FIG. 39 is a table showing a correspondence relation between the piezoelectric bimorph devices according to a fifth modification and a sixth modification.

In a second modification of the second embodiment of the present invention, the piezoelectric bimorph devices 31 to 34 are operated as exciters for X-axis vibration, the piezoelectric bimorph devices 35 to 38 are operated as detectors for detecting the Coriolis force Fcy in the Y-axis direction and further, the piezoelectric bimorph devices 41 to 48 are operated as detectors for detecting the Coriolis force Fcz in the Z-axis direction. FIG. 35 shows a table for combination of the piezoelectric bimorph devices of the second modification. As a circuit for excitation in the X-axis direction, as shown in FIG. 36, the upper electrodes 4*a* and the intermediate electrodes 6*a* of the piezoelectric bimorph devices 31, 32 and the upper electrodes 4*a* and the intermediate electrodes 6*a* of the piezoelectric bimorph devices 33, 34 are connected in reverse phase. As a detection circuit for detection of the Y-axis, as shown in FIG. 37, the upper electrodes 4*a* and the intermediate electrodes 6*a* of the piezoelectric bimorph devices 35, 36 are connected in reverse phase while the upper electrodes 4*a* and the intermediate electrodes 6*a* of the piezoelectric bimorph devices 37, 38 are connected in reverse phase and then, all of them are connected in series so as to detect the generated voltage Vy. As a circuit for detection of the Z-axis, as shown in FIG. 38, the upper electrodes 4*a* and the intermediate electrodes 6*a* of the respective piezoelectric bimorph devices 41 to 48 are connected in series so as to detect the generated voltage Vz.

In a third modification of the second embodiment of the present invention, the piezoelectric bimorph devices 41 to 44 are made to function as exciters for vibration in the X-axis direction, the piezoelectric bimorph devices 45 to 48 are made to function as detectors for detecting the Coriolis force Fcy in the Y-axis direction and the piezoelectric bimorph devices 31 to 38 are made to function as detectors for detecting the Coriolis force Fcz in the Z-axis direction. FIG. 35 shows a table about combinations of the piezoelectric bimorph devices 31 to 38, 41 to 48 of the second modification and the third modification. An excitation circuit and a detection circuit may be understood based on corresponding reference numerals in FIGS. 36, 37 and 38. That is, as a circuit for excitation in the X-axis direction, the same circuit as FIG. 36 may be used, as a detection circuit for detection of the Y-axis, the same circuit as FIG. 37 may be used and as a detection circuit for detection of the Z-axis, the same circuit as FIG. 38 may be used. FIG. 39 shows a table about combinations of the piezoelectric bimorph devices of a fifth modification and a sixth modification which are angular rate sensors capable of detecting the angular rate around the X-axis and the Z-axis by exciting the weight 3 in the Y-axis direction. According to the fifth modification and the sixth modification, the angular rate and acceleration around two axes can be detected.

Third Embodiment

In the third embodiment, an angular rate sensor capable of simultaneously detecting triaxial accelerations and biaxial angular velocities will be described in detail. The angular rate sensor of the third embodiment has the same structure as the angular rate sensor of the second embodiment shown in FIG. 22. The combination of the exciter and the detector and part of the detection circuit are partly modified.

In this angular rate sensor, the piezoelectric bimorph devices 31 to 34 are used as detection devices for detecting a displacement in the X-axis direction of the weight 3 and the piezoelectric bimorph devices 35 to 38 are used as detection devices for detecting a displacement in the Y-axis direction of the weight 3 as in the second embodiment. The piezoelectric bimorph devices 41 to 44 are used as detection devices for detecting a displacement in the Z-axis direction of the weight 3 and the piezoelectric bimorph devices 45 to 48 are used as excitation devices for vibrating the weight 3 in the Z-axis direction. As shown in FIG. 40, an AC drive signal is applied to the upper electrodes 4a and the intermediate electrodes 6a of the piezoelectric bimorph devices 45 to 48.

In such an angular rate sensor, as described above, acceleration acting on the weight 3 and a voltage produced from the Coriolis force are detected at the same time. Thus, a voltage originated from the acceleration and a voltage originated from the Coriolis force need to be separated from a detected voltage. According to this embodiment, a low-frequency pass filter and a high-frequency pass filter are incorporated in the detection circuit in order to separate the voltage originated from the acceleration and the voltage originated from the Coriolis force. FIG. 41 shows a detection circuit for detecting a displacement in the X-axis direction of the weight 3. In this detection circuit, a voltage generated between the upper electrodes 4a and the intermediate electrodes 6a of the piezoelectric bimorph devices 31 to 34 is amplified by a differential amplifier 51 and output to a low-frequency pass filter 52 and a high-frequency pass filter 53. By feeding this amplified voltage to the low-frequency pass filter 52, only components originating from the acceleration in the X-axis direction of the voltage are obtained. Further, by feeding the voltage to the high-frequency pass filter 53, only components originating from the Coriolis force in the X-axis direction of the voltage Vx are obtained. Preferably, the excitation frequency of a vibration to be applied to the weight 3 is set to 10 kHz in order to detect the angular rate and the cut-off frequencies of the low-frequency pass filter 52 and the high-frequency pass filter 53 are set to several hundred Hz. Consequently, components originating from an acceleration existing in a frequency band of several tens of Hz and components originating from the Coriolis force existing in a frequency band of the excitation frequency can be separated without any problem. The piezoelectric bimorph devices 35 to 38 are used to detect a displacement in the Y-axis direction of the weight 3. Then, by using the same detection circuit as for the X-axis direction shown in FIG. 41 for the piezoelectric bimorph devices 35 to 38, a voltage originating from the acceleration in the Y-axis direction and a voltage originating from the Coriolis force in the Y-axis direction can be detected separately.

FIG. 42 shows a detection circuit for detecting a displacement in the Z-axis direction of the weight 3. Because the weight 3 is vibrated only in the Z-axis direction, no Coriolis force acts in the Z-axis direction. However, because a vibration is applied in the Z-axis direction forcibly, the weight 3 is displaced in the Z-axis direction. Thus, the piezoelectric bimorph devices 45 to 48 are deformed, so that charges are generated in the electrodes. Thus, in the detection circuit, a voltage originating from the acceleration and a voltage originating from the vibration are detected at the same time. However, because the voltage originating from the vibration exists only in the frequency band of an excitation frequency, the voltage originating from the acceleration and the voltage originating from the vibration can be detected separately through the frequency filter.

In the detection circuit for detecting a displacement in the Z-axis direction of the weight 3, a voltage generated between the upper electrodes 4a and the intermediate electrodes 6b of the piezoelectric bimorph devices 41 to 44 is amplified by the differential amplifier 51 and output to the low-frequency pass filter 52. This amplified voltage passes the low-frequency pass filter 52 and only a voltage originating from the acceleration is detected.

The separation of the voltage originating from the acceleration and the voltage originating from the vibration may be carried out by the signal processing described in the second embodiment.

To calculate the angular rate from a detected Coriolis force as described above, it is necessary to calculate or detect a velocity v in the vibration direction of the weight 3. In the angular rate sensor of the second embodiment, the velocity in the vibration direction of the weight 3 can be determined depending on the amplitude and number of vibrations of an AC voltage applied to the piezoelectric bimorph devices 41 to 48 for excitation. However, the velocity v which is determined depending on the amplitude and number of vibrations of the AC voltage contains some errors due to influences of the atmospheric pressure. According to this embodiment, the velocity v in the vibration direction of the weight 3 obtained from the amplitude and number of vibrations of AC voltage can be corrected and determined by detecting an acceleration in a vibration direction of the weight 3 and referring to this acceleration. Consequently, the angular rate can be detected at a higher precision.

Other embodiment of the angular rate sensor will be described. By making the piezoelectric bimorph detectors 15 to 18 of the accelerometer of the first embodiment function as the exciters, the biaxial angular rate sensor can be constructed. Under such a configuration, the exciters for vibrating the weight 3 in the Z-axis direction by means of the piezoelectric bimorph detectors 15 to 18, the detectors for detecting the acceleration and the Coriolis force in the X-axis direction by means of the piezoelectric bimorph detectors 11, 12 and the detectors for detecting the acceleration and the Coriolis force in the Y-axis direction by means of the piezoelectric bimorph detectors 13, 14 function. According to this embodiment, the angular rate sensor is constituted of four detectors and four exciters. This embodiment enables the biaxial acceleration and angular rate around two axes to be detected.

The present invention is not restricted to the above-described embodiments but their components may be modified within a scope not departing from the philosophy of the invention. Further, various embodiments of the invention may be formed by appropriate combinations of the plural components disclosed in the above-described embodiments. For example, it is permissible to exclude some components from the components indicated in the embodiments. Further, the components of different embodiments may be combined appropriately.

In the multi-axial accelerometer and angular rate sensor of the present invention, the weight located in the center of the sensor and the base formed to surround the weight are connected directly with the piezoelectric bimorph detectors and piezoelectric bimorph exciters having the bimorph structure in which the electrodes and the piezoelectric films are stacked. Because the detection sensitivities to the acceleration and angular rate are improved by this structure, the piezoelectric film can be formed of members whose piezoelectric constant has a small temperature dependency such as aluminum nitride (AlN) or zinc oxide (ZnO). Further, the sensor can be reduced in size because the mass and dimensions of the weight can be reduced due to improvement of the detection sensitivity. The piezoelectric bimorph detectors and the piezoelectric bimorph exciters have a flexural shape. This exciter can reduce influences of the residual stress even if the residual stress, which is unavoidable in formation of the piezoelectric film according to the film formation method, exists inside the piezoelectric film. That is, the piezoelectric bimorph detector having a stable detection sensitivity and the piezoelectric bimorph exciter having a stable exciting performance can be formed.

According to the present invention, any flexible base plates employed in the above-mentioned Japanese Patent Nos. 3141954 and 3534251 are not used. Accordingly, a joint process for joining the flexible base plate with the weight prepared separately, and an SOI base plate for forming the flexible base plate are unnecessary, thereby significantly simplifying the structure of the sensor and manufacturing process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A triaxial accelerometer comprising:
a weight to which an acceleration is applied;
a base having a hollow space which allows the weight to move;
a plurality pairs of piezoelectric bimorph detectors having one ends connected to the base and other ends connected to the weight so as to support the weight movably with respect to the acceleration, which are arranged in a plane having first and second axes perpendicularly crossed on the weight, the plurality pairs of piezoelectric bimorph detectors including
first pair of piezoelectric bimorph detectors arranged symmetrically with respect to the first axis,
second pair of piezoelectric bimorph detectors arranged symmetrically with respect to the second axis, and
third and fourth pairs of the piezoelectric bimorph detectors arranged symmetrically with respect to the first and second axes,
wherein each of the piezoelectric bimorph detectors is so shaped as to have first and second straight portions linearly extended from the one end and the other end, respectively, and bent portions coupling the first and second straight portions and extended in a bent shape from the straight portions, and
each of the piezoelectric bimorph detectors has a deformable laminated structure having first, second and third electrodes and first and second piezoelectric films which are disposed between the first and second electrodes, and the second and third electrodes, respectively, the first, second and third electrodes generating voltages depending on a deformation of the laminated structure which is produced due to the acceleration applied to the weight; and
a detection circuit which detects each of three dimensional components of the acceleration from the voltages.

2. The accelerometer according to claim 1, wherein the bent portion of the piezoelectric bimorph detector is formed as to have a frame shape.

3. The accelerometer according to claim 1, wherein the piezoelectric bimorph detector includes first and second parts, and each of the first, second and third electrodes includes a pair of electrode plates extended into each of the first and second parts, the first electrode in the first portion, the second electrode in the second part and the third electrode in the first part are connected electrically through a via hole formed in the piezoelectric film, and the first electrode in the second part, the second electrode in the first part and the third electrode in the second part are connected electrically through the via hole formed in the piezoelectric film.

4. The accelerometer according to claim 1, wherein the first piezoelectric film and the second piezoelectric film are polarized in a thickness direction and formed of aluminum nitride (AlN) or zinc oxide (ZnO).

5. A biaxial angular rate sensor comprising:
a weight to which one or both of an acceleration and a Coriolis force are applied;
a base having a hollow space which allows the weight to move;
first and second pairs of piezoelectric bimorph detectors having one ends connected to the base and other ends connected to the weight so as to support the weight movably with respect to the acceleration and/or the Coriolis force, which are arranged in a plane having first and second axes perpendicularly crossed on the weight, wherein the first pair of piezoelectric bimorph detectors are arranged symmetrically with respect to the first axis, the second pair of piezoelectric bimorph detectors are arranged symmetrically with respect to the second axis, and each of the piezoelectric bimorph detectors is so shaped as to have first and second straight portions linearly extended from the one end and the other end, respectively, and first bent portions coupling the first and second straight portions and extended in a bent shape from the first and second straight portions;
third and fourth pairs of piezoelectric bimorph exciters having one ends connected to the base and other ends connected to the weight so as to support the weight, wherein the piezoelectric bimorph exciters are arranged in the plane having the first and second axes, the third pair of piezoelectric bimorph exciters are arranged symmetrically with respect to the first axis, the fourth pair of piezoelectric bimorph exciters are arranged symmetrically with respect to the second axis, and each of the piezoelectric bimorph exciters is so shaped as to have third and fourth straight portions linearly extended from the one end and the other end, respectively, and second bent portions coupling the third and fourth straight portions and extended in a bent shape from the third and fourth straight portions;
wherein each of the piezoelectric bimorph detectors and the piezoelectric bimorph exciters has a deformable laminated structure having first, second and third electrodes and first and second piezoelectric films which are disposed between the first and second electrodes, and the second and third electrodes, respectively, the first, second and third electrodes of the piezoelectric bimorph detectors generating voltages depending on a deformation of the laminated structure which is produced due to the acceleration applied to the weight, and each of the piezoelectric bimorph exciters is deformed due to an application of AC voltage so that each of the piezoelectric bimorph exciter vibrates the weight so as to generates the Coriolis force with the angular rate around the first and second axes of the weight; and
a detection circuit which detects the acceleration and/or the angular rate acting around the first and second axes from the voltage.

6. The angular rate sensor according to claim 5, further comprising two pairs of fifth and sixth piezoelectric bimorph detectors to detect an acceleration in a third axis direction, the third axis intersecting the intersection and being perpendicular to the virtual plane, wherein the angular rate sensor detects each component of the angular rate around the first and second axes and/or each component of the first, second and third axes of the acceleration.

7. The angular rate sensor according to claim 5, wherein the first and second bent portions are formed in a frame shape.

8. The angular rate sensor according to claim 5, wherein each of the piezoelectric bimorph detector and the piezoelectric bimorph exciter includes first and second parts and the first electrode, the second electrode and the third electrode include a pair of electrode plates extended into each of the first and second portions, the first electrode in the first part, the second electrode in the second part and the third electrode in the first part are connected electrically through a via hole formed in the piezoelectric film, and the first electrode in the second part, the second electrode in the first part and the third electrode in the second part are connected electrically through the via hole formed in the piezoelectric film.

9. The angular rate sensor according to claim 5, wherein the first piezoelectric film and the second piezoelectric film are polarized in a thickness direction and formed of aluminum nitride (AlN) or zinc oxide (ZnO).

10. The angular rate sensor according to claim 5, wherein the detection circuit comprises a frequency filter to separate a component originating from the acceleration and a component originating from the angular rate from the detection signal.

* * * * *

UNITED STATES PATENT AND TRADEMARK OFFICE
CERTIFICATE OF CORRECTION

PATENT NO. : 8,117,912 B2
APPLICATION NO. : 12/411861
DATED : February 21, 2012
INVENTOR(S) : Kawakubo et al.

It is certified that error appears in the above-identified patent and that said Letters Patent is hereby corrected as shown below:

Claim 5, column 26, lines 62-63, change "so as to generates" to --so as to generate--.

Signed and Sealed this
Twenty-ninth Day of May, 2012

David J. Kappos
*Director of the United States Patent and Trademark Office*